United States Patent [19]

Bonner et al.

[11] 4,141,005
[45] Feb. 20, 1979

[54] DATA FORMAT CONVERTING APPARATUS FOR USE IN A DIGITAL DATA PROCESSOR

[75] Inventors: Bruce R. Bonner; Nicholas B. Sliz, both of Apalachin, N.Y.

[73] Assignee: International Business Machines Corporation, Armonk, N.Y.

[21] Appl. No.: 741,079

[22] Filed: Nov. 11, 1976

[51] Int. Cl.² .............................................. G06F 3/00
[52] U.S. Cl. ............................. 340/347 DD; 364/200
[58] Field of Search ... 364/200 MS File, 900 MS File; 340/347 DD; 235/154

[56] References Cited

U.S. PATENT DOCUMENTS

| | | | |
|---|---|---|---|
| 3,292,158 | 12/1966 | Schneberger | 364/200 |
| 3,387,280 | 6/1968 | Bina | 364/200 |
| 3,493,936 | 2/1970 | Gunderson | 364/200 |
| 3,599,186 | 8/1971 | May | 364/200 |
| 3,772,654 | 11/1973 | Evans | 364/200 |

*Primary Examiner*—Charles D. Miller
*Attorney, Agent, or Firm*—Richard E. Bee; Saul A. Seinberg

[57] ABSTRACT

Data format converting apparatus is described for simultaneously converting multiple bytes of zoned decimal data to packed decimal data or vice versa. In the preferred embodiment, this format converting apparatus is obtained by adding a minimum amount of additional circuitry to a multibyte flow-through type data shifter used for providing the normal data shifting operations in a digital data processor. In particular, a zoned-decimal-to-packed-decimal conversion capability is provided by combining additional switching logic with the normal shifter switching logic for enabling the conductors for nonadjacent data fields on the shifter input data bus to be coupled to the conductors for adjacent data fields on the shifter output data bus. A packed-decimal-to-zoned-decimal conversion capability is provided by adding further switching logic for enabling the conductors for adjacent data fields on the shifter input data bus to be coupled to the conductors for nonadjacent data fields on the shifter output data bus. Control circuitry is provided for selectively enabling either normal data shifting operations or zoned-to-packed format conversion operations or packed-to-zoned format conversion operations. The shifting and format converting hardware is organized so that implementation in the form of large-scale integration circuitry can be accomplished with a minimum number of integrated circuit chips and a minimum number of chip input/output connections per chip.

18 Claims, 41 Drawing Figures

FIG. 4
| DECIMAL VALUE | HEX DIGIT | BINARY | |
|---|---|---|---|
| 0 | 0 | 0000 | ⎫ |
| 1 | 1 | 0001 | ⎪ |
| 2 | 2 | 0010 | ⎪ |
| 3 | 3 | 0011 | ⎪ |
| 4 | 4 | 0100 | ⎬ DECIMAL DIGIT CODES |
| 5 | 5 | 0101 | ⎪ |
| 6 | 6 | 0110 | ⎪ |
| 7 | 7 | 0111 | ⎪ |
| 8 | 8 | 1000 | ⎪ |
| 9 | 9 | 1001 | ⎭ |
| 10 | A | 1010 | + ⎫ |
| 11 | B | 1011 | − ⎪ |
| 12 | C | 1100 | + ⎬ DECIMAL SIGN CODES |
| 13 | D | 1101 | − ⎪ |
| 14 | E | 1110 | + ⎪ |
| 15 | F | 1111 | + ⎭ |
PACK INSTRUCTION
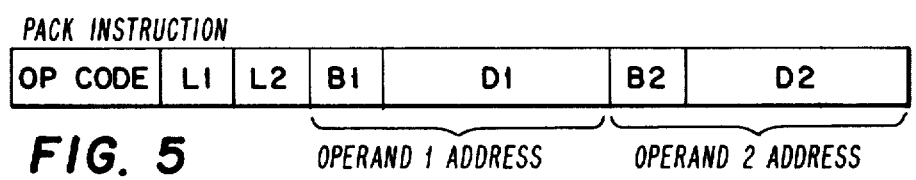
FIG. 5
UNPACK INSTRUCTION
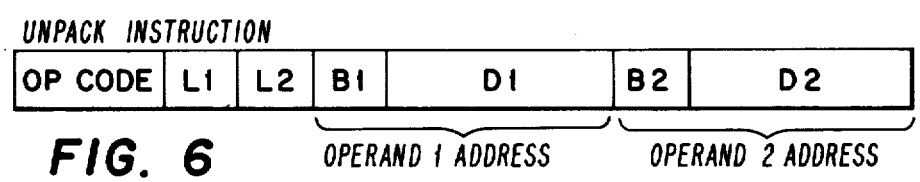
FIG. 6
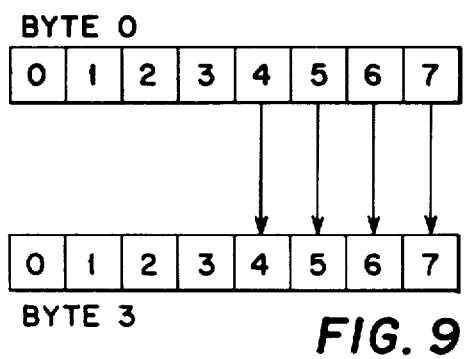
FIG. 9
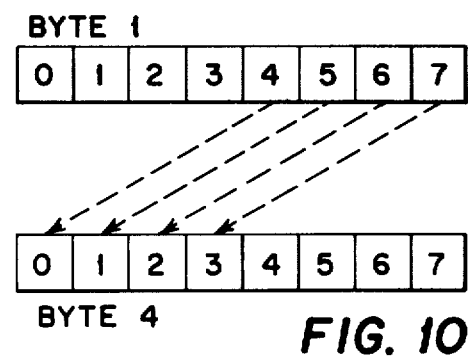
FIG. 10

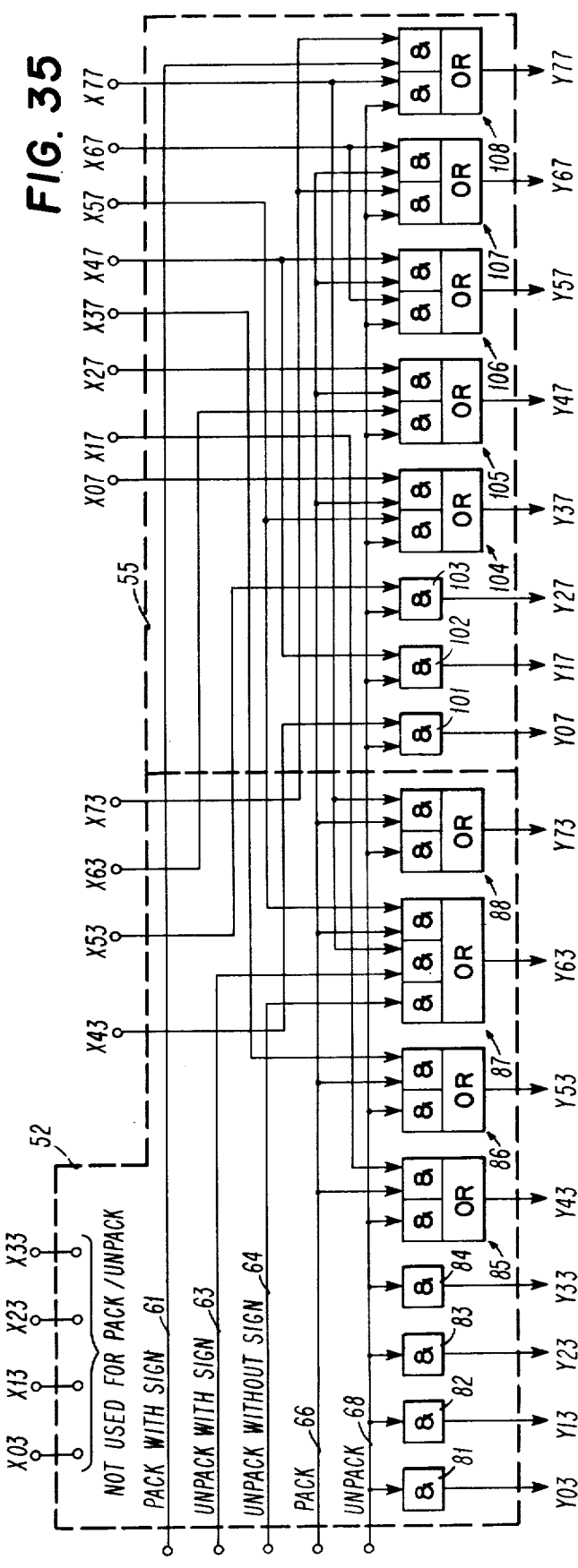

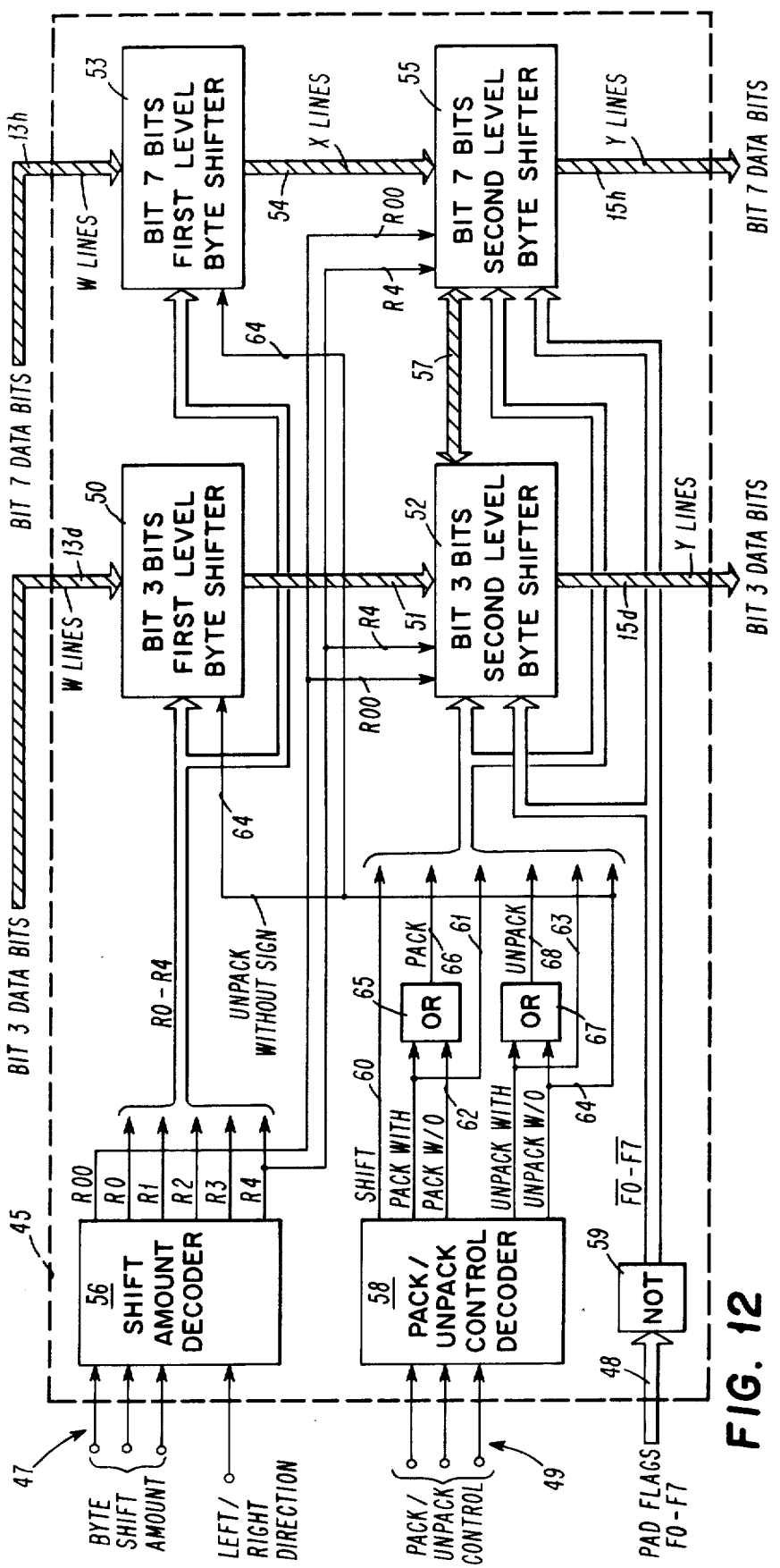

DATA FORMAT CONVERTING APPARATUS FOR USE IN A DIGITAL DATA PROCESSOR

BACKGROUND OF THE INVENTION

This invention relates to methods and apparatus for use in digital computers and digital data processors for converting data from one format to another.

Peripheral input/output devices supply data to digital data processors in the form of binary coded characters wherein each character represents a single alphabetical letter or numerical digit or graphic symbol (for example, punctuation mark) or control character. In a typical class of present-day, large-scale data processors, each character has a length of one byte, with a byte being defined as a sequence of eight adjacent binary data bits. Eight bits provide 256 different unique code values and, hence, a character set that can represent up to 256 different characters.

In the case of numerical data, the data from the input/output device is in a zoned decimal format wherein the lower order four bits of each character or byte constitute a digit field and the higher order four bits of each character or byte constitute a zone field. The four-bit digit field contains a binary coded decimal representation of a decimal digit value and the 4-bit zone field contains a unique zone code which identifies the character as being a numerical value and not an alphabetical letter, graphic symbol or control character.

Unfortunately, the arithmetic and logic units which perform the numerical calculations in most present-day data processors cannot handle numerical data in the zoned format. The presence of the zone fields would produce erroneous results. Thus, it is necessary to convert the zoned numerical data received from an input/output device to a packed decimal format before using it to perform numerical calculations. This is accomplished by deleting the zone fields and placing the digit fields adjacent to each other so as to form continuous sequences having only digit fields. The performance of this zoned-to-packed format conversion is commonly referred to as "packing".

In typical data processors, the programmer has the option of directing the machine to perform the numerical calculations using either decimal arithmetic or pure binary arithmetic. In the latter case, it is further necessary to convert the packed decimal numerical data to a pure binary format before performing the calculations. In either case, however, the original zoned data must be converted to the packed format.

A converse type of situation applies when it is desired to send the results of numerical calculations back to a peripheral input/output device. The numerical results must be converted from the packed format back to the zoned format before the data is returned to the input/output device. This requires the separation of the digit fields and the insertion of the unique zone field code for numerical characters in the intervening spaces. The performance of this packed-to-zoned format conversion is commonly referred to as "unpacking". For the case of pure binary calculations, the binary results are first converted to the packed format and the packed format results are then converted to the zoned format.

As can be appreciated from the foregoing, when a digital computer or data processor is used to perform user application programs involving numerical data and numerical calculations, a goodly number of packing and unpacking operations can be required. Unfortunately, with present-day data processors, these packing and unpacking operations are relatively time consuming. With present-day processors, the bytes of data are packed or unpacked one byte at a time, with at least two machine cycles being required to obtain one packed byte or, conversely, to unpack one packed byte. Thus, it would be very desirable to have a faster way of doing the data packing and unpacking. This would provide a significant improvement in the performance of the data processor. At the same time, it would be even more desirable if this could be accomplished with a minimum of cost, such as by adding a relatively small amount of additional circuitry to the circuitry otherwise required by the data processor.

SUMMARY OF THE INVENTION

It is an object of the invention, therefore, to provide new and improved data format converting apparatus for performing packing and unpacking operations in a much faster manner.

It is another object of the invention to provide new and improved data format converting apparatus for use in a digital data processor for enabling the simultaneous packing or unpacking of multiple bytes of numerical data.

It is a further object of the invention to provide new and improved circuitry for enabling a data shifter of multibyte width used for normal data shifting operations in a data processor to alternatively and selectively perform either a zoned-decimal-to-packed-decimal conversion or a packed-decimal-to-zoned-decimal conversion on the multiple bytes of data passing through the data shifter.

It is an additional object of the invention to provide new and improved high-speed multibyte data shifting and format converting apparatus that can be implemented in the form of large-scale integration circuitry by means of a minimum number of integrated circuit chips having a minimum number of chip input/output connections.

In accordance with one feature of the invention, there is provided apparatus for simultaneously converting multiple bytes of decimal data from one to the other of a zoned format and a packed format. Such apparatus includes first and second multibyte data buses having correspondingly designated conductors for conveying data bits in a parallel manner. Such apparatus further includes circuitry for coupling selected groups of conductors in the first data bus to differently designated groups of conductors in the second data bus so that the selected data fields on the first data bus are supplied to the second data bus in a displaced manner relative to the bit designations on the two data buses and with the amount of displacement being different for different ones of the selected data fields on the first data bus, whereby the selected data fields are reproduced on the second data bus with a different bit spacing between such fields.

In accordance with another feature of the invention, there is provided in a digital data processor, a combination which includes data flow circuitry for simultaneously supplying multiple bytes of binary coded data in a parallel manner. This combination also includes multibyte shifter circuitry located in the processor data flow for simultaneously receiving these multiple bytes of data, performing shift operations thereon and supplying the shifted bytes of data back to the data flow in a parallel manner. This combination further includes format conversion circuitry associated with the shifter circuitry for enabling the shifter circuitry to alternatively and selectively perform a data format conversion operation on the multiple bytes of data passing through the shifter circuitry.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 4 is a chart showing the relationship between corresponding decimal, hexadecimal and binary number values;

FIG. 5 shows the machine language instruction format for a representative form of pack instruction;

FIG. 6 shows the machine language instruction format for a representative form of unpack instruction;

FIG. 9 shows in greater detail the nature of the byte 0 to byte 3 transfer in FIG. 7a;

FIG. 10 shows in greater detail the nature of the byte 1 to byte 4 transfer in FIG. 7a;

FIG. 11 is a high-level block diagram of a representative embodiment of data shifting and format converting apparatus constructed in accordance with the present invention which can be used to considerable advantage as the byte shifter and format converter in the data processor of FIG. 1;

FIG. 12 is a more detailed block diagram of the Bit 3/Bit 7 portion of the data shifting and format converting apparatus of FIG. 11;

FIG. 13 shows the microword format for a representative form of shift microword which is used in connection with the use of the present invention in the FIG. 1 data processor;

FIG. 35 is an overall wiring and logic diagram for the two second-level byte shifters of FIG. 14, but showing only the wiring and logic circuitry needed for performing the packing and unpacking operations and omitting the wiring and logic circuitry needed for normal data shifting operations.

DESCRIPTION OF THE PREFERRED EMBODIMENTS

Figure 1:
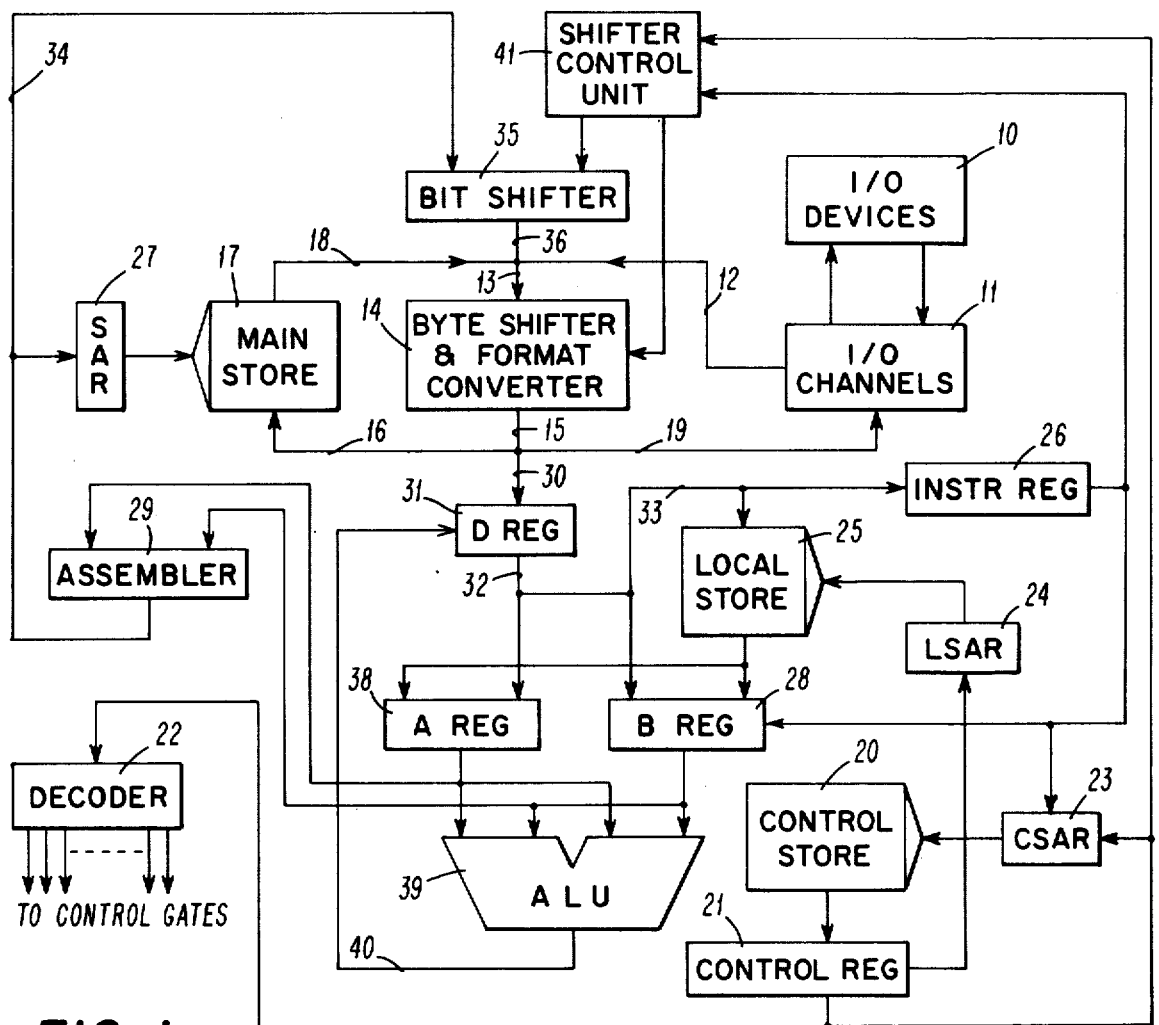
FIG. 1 is a functional block diagram of the data flow for a digital data processor in which the present invention may be used to significantly increase the performance of the processor.

Referring to FIG. 1, there is shown the data flow for a representative large-scale microprogram controlled digital data processor wherein the present invention may be used with considerable advantage. Unless otherwise noted, the data buses and functional units shown in FIG. 1 are provided with a data handling width of several bytes so that multibyte chunks of data can be moved and manipulated in a parallel and simultaneous manner. For sake of example, it is assumed that the basic data flow width is eight bytes and that each byte is composed of eight data bits plus one parity check bit. Thus, for this example, the data will, for the most part, be moved and manipulated in sixty-four bit chunks. For simplicity, the parity check bits will generally not be mentioned herein.

A user application program in machine language form is supplied to the data processor by a peripheral input/output (I/O) device 10 which may be, for example, a punched card reader or a magnetic tape unit. The instructions and data making up the program are supplied by way of an input/output (I/O) channel 11, data buses 12 and 13, a byte shifter and format converter 14 and data buses 15 and 16 to a main storage unit 17. The program is thereafter executed by reading the instructions out of the main storage 17 one at a time, performing the operations called for by the instructions and storing the results back into the main storage 17. At the appropriate time or times, the results are sent back to another of the I/O devices 10, in this case, for example, a cathode-ray tube display unit or a typewriter unit or a printer unit to provide the visible or hardcopy output needed by the user. This is accomplished by way of data buses 18 and 13, byte shifter and format converter 14, data buses 15 and 19 and an I/O channel 11.

Typically, data is passed between an I/O device 10 and an I/O channel 11 one byte at a time. The I/O channel 11 includes sufficient buffering so that, for the case of incoming data, for example, enough bytes are accumulated in the buffer so that the data can be presented to the processor data bus 12 eight bytes at a time. In the case of outgoing data, the buffer holds the eight bytes received on data bus 19 for a sufficient length of time to permit the one byte at a time transmission to the I/O device 10. The significant point is that the data buses within the data processor, namely, the data buses 12, 13, 15, 16, 18 and 19, as well as most of the other data buses to be mentioned hereinafter, are eight bytes in width. This means that each of these processor data buses is comprised of seventy-two bit lines or conductors for enabling the simultaneous transmission of the sixty-four data bits and the eight parity check bits making up each eight byte segment of data.

Since the processor being considered is of the microprogrammed type, the movement and manipulation of the program instructions and data within the processor are controlled by means of microwords stored in a control storage unit 20. One microword at a time is read from the control storage 20 and set into a control register 21. Each microword controls the processor for one machine cycle. The control fields in each microword are decoded by a decoder 22 to provide the elemental control signals which enable and disable the various control gates associated with the different data buses in the processor. Thus, among other things, each microword determines which data buses are to be enabled during its machine cycle, hence, determining the data movement path for such machine cycle. For simplicity, the data bus control gates are not shown in FIG. 1. Each microword also includes a field containing the address of the next microword. This next microword address is supplied to a control storage address register (CSAR) 23 to determine the microword to be used for the next machine cycle.

A given microword may also include a field containing a local storage address which, when appropriate, is supplied to a local storage address register (LSAR) 24 for purposes of addressing a local storage unit 25. The local storage unit or local store 25 is best thought of as being a collection of addressable high-speed registers which are used for holding the various kinds of data, intermediate results, storage addresses and the like which may be needed or generated during the course of the data processing operations. For example, it is assumed in the present embodiment that one of these local storage registers is used as an instruction counter for holding the main storage address for the next machine language program instruction in the main storage 17.

Briefly considering in a general way the procedure for a more or less typical machine language program instruction, the first step is to fetch the instruction from the main storage 17 and to set it into an instruction register 26. This is accomplished by reading the next instruction address from the instruction counter in local store 25 and setting such address into a storage address register (SAR) 27 for the main storage 17. Such address is supplied to SAR 27 by way of a B register 28 and an assembler 29. The addressed instruction is read from main storage 17 and supplied to the instruction register 26 by way of data buses 18 and 13, byte shifter and format converter 14, data buses 15 and 30, destination (D) register 31 and data buses 32 and 33. As part of the instruction fetching operations, the operand addresses are calculated from the base and displacement values contained in the instruction and such results are set into appropriate operand address registers in local store 25. Also, the instruction counter in local store 25 is updated so as to contain the address of the next machine instruction.

The operation code (op code) portion of the machine instruction in instruction register 26 is sent to CSAR 23 for purposes of invoking the proper sequence of microwords for executing the machine instruction in question. In a more or less typical case (there are many different variations), the instruction is executed by fetching the operands from the main storage 17 and setting them into appropriate registers in the local store 25. The operands are then manipulated in the desired manner and the result put back into the local store 25. The result is thereafter read from the local store 25 and written into the appropriate location (typically, one of the operand locations) in the main storage 17. The transfer of the data from the local store 25 to the main store 17 is accomplished by way of B register 28, assembler 29, data bus 34, bit shifter 35, data buses 36 and 13, byte shifter and format converter 14 and data buses 15 and 16.

For the case of one form of arithmetic add instruction, for example, the two pieces of data or operands to be added are read from the main storage 17 and set into the local store 25. The two operands are then accessed from the local store 25 and set into the A register 38 and the B register 28. The data values in the A and B registers 38 and 28 are then added by means of an arithmetic and logic unit (ALU) 39 and the result is sent back to the local store 25 by way of data bus 40, destination register 31 and data buses 32 and 33. In some cases, for example the case of a decimal add instruction, the operands may have a length greater than eight bytes. In such cases, different eight-byte segments of the operands are processed by the ALU 39 during different machine cycles, with the final overall result being built up in the local store 25 in a stepwise manner.

The bit shifter 35 and the byte shifter portion of shifter/converter 14 are used to provide the normal data shifting operations which are needed during the execution of various machine language program instructions (including but not limited to the various "shift" instructions). The byte shifter portion of shifter/converter 14 shifts the data in byte-size increments or steps and the bit shifter 35 shifts the data in bit-size increments or steps. Thus, for example, if a right shift of twenty-nine bit positions (three bytes and five bits) is desired, the byte shifter portion of shifter/converter 14 would be set to provide a three-byte right shift and the bit shifter 35 would be set to provide a five-bit right shift, thus giving an overall shift of twenty-nine bits to the right. For the present example of an eight byte wide data flow, the byte shifter portion of shifter/converter 14 is constructed to provide a shift amount anywhere in the range of zero (no shift) through seven bytes to either the right or left. The bit shifter 35 is constructed to provide a shift anywhere in the range of zero (no shift) through seven bits. The amount of shift and the direction of shift (left or right) are controlled by a shifter control unit 41 which, in turn, receives control information from the control register 21 and, in some cases (for example, shift type machine language instructions), from the instruction register 26.

Bit shifter 35 and the byte shifter portion of shifter/converter 14 are of the flow through type, as opposed to the shift register type. In other words, eight bytes of data enters the shifter, flows therethrough in a parallel manner and appears on the shifter output bus, all in one continuous movement and without resort to any shifting or clocking pulses. The shifting action is provided by means of switching elements constructed of combinational logic circuits which function to connect the conductors of the shifter input data bus to the proper ones of the conductors in the shifter output data bus.

Suitable forms of construction for one or more of the byte shifter portion of shifter/converter 14, the bit shifter 35 and the shifter control unit 41 are described in the following reference sources:

(1) U.S. Pat. No. 3,311,896, granted to James W. Delmege, Jr. and Ralph W. Pulver, Jr. on Mar. 28, 1967 and entitled "Data Shifting Apparatus" and assigned to International Business Machines Corporation of Armonk, New York;

(2) U.S. Pat. No. 3,916,388, granted to Everett M. Shimp and Nicholas B. Sliz on Oct. 28, 1975 and entitled "Shifting Apparatus for Automatic Data Alignment" and assigned to International Business Machines Corporation of Armonk, New York; and (3) Technical article by E. M. Shimp and N. B. Sliz entitled "Two-Level Data Shifting System", appearing at pages 3186 through 3194 of the Mar. 1976 issue of the IBM Technical Disclosure Bulletin published by International Business Machines Corporation of Armonk, New York.

The descriptions set forth in these reference sources are hereby incorporated in the present application by this reference thereto.

The Shimp and Sliz patent describes in considerable detail an appropriate form of construction for both the byte shifter portion of shifter/converter 14 and the portion of the shifter control unit 41 which is used to control this byte shifter portion. As indicated by this patent, the byte shifter portion is also useful for providing an automatic data boundary alignment function when transferring data to or from the main storage 17. This boundary alignment function is in addition to the data shifting operations discussed above and normally associated with the execution of various machine instructions. The Shimp and Sliz technical article describes a particularly useful form of construction for the shift and pad controls for both the byte shifter portion of shifter/converter 14 and the bit shifter 35, such shift and pad controls being located in the shifter control unit 41 herein.

None of these reference sources describes or suggests the novel format converting apparatus of the present invention or the novel combination of such apparatus with a byte shifter used for data shifting purposes. In particular, the foregoing references relate only to the byte shifter portion of unit 14 and not to the format converter portion of such unit.

Figure 2:
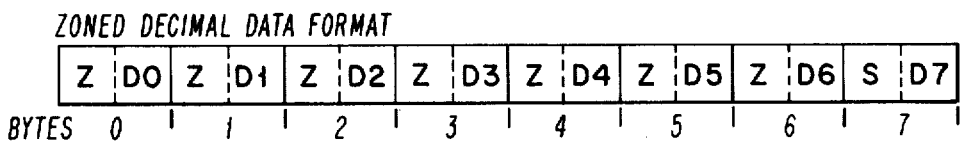
FIG. 2 is a data sequence chart showing a representative sequence of numerical data in a zoned decimal format.

As indicated in the introduction, numerical data supplied by the I/O channel 11 to the main storage 17 or vice versa is in a zoned decimal format. Data in this format is illustrated in FIG. 2 wherein the letter Z denotes a four-bit zone field, the letter D is used to denote a four-bit digit field and the letter S denotes a four-bit sign code field. In particular, FIG. 2 represents a typical data layout appearing on either the eight-byte data bus 12 or the eight-byte data bus 19 except that, in some cases, the sign field S will be replaced by a zone field Z.

Figure 3:
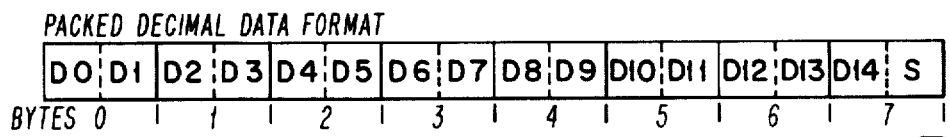
FIG. 3 is a data sequence chart showing a representative sequence of numerical data in a packed decimal format.

Unfortunately, the ALU 39 is not capable of performing arithmetic operations with numerical data in this zoned format. The presence of the zone fields Z would cause the ALU 39 to produce an erroneous result. It is, therefore, necessary to convert this zoned decimal data to a packed decimal format before it is sent to the ALU 39 for purposes of performing a numerical calculation. FIG. 3 illustrates the packed decimal format for the case of an eight-byte sequence of numerical data. In some cases, the sign field S may be replaced by an additional four-bit digit field. As is seen by comparing FIGS. 2 and 3, the zoned-to-packed conversion (frequently referred to as a "packing" operation) is accomplished by deleting the zone fields and pushing the digit fields together in an adjacent side-by-side manner.

The converse problem occurs when it comes time to send the results of a numerical calculation to the I/O device 10. The I/O device 10 needs its data to be in the zoned format in order to be able to distinguish numbers from alphabetical letters, graphic symbols and control characters. Thus, the numerical result data must be converted from the packed format to the zoned format (frequently called an "unpacking" operation) before it can be sent to the I/O device 10. This requires a spreading apart of the digit fields and the insertion of the unique zone code for numerical data into the intervening gaps thus created.

Each four-bit digit field in either the zoned or packed format contains a binary coded decimal representation of a decimal digit value. The relationship between the different four-bit binary codes and the different decimal values is shown in the chart of FIG. 4. As there seen, the first ten of the sixteen possible four-bit combinations are used to represent the decimal digits 0 through 9, respectively. The remaining six four-bit combinations are used to provide sign codes for the sign field S in the manner indicated in the lower part of FIG. 4. It is further assumed herein that the unique zone field code for numerical data is "1111". Thus, each of the zone fields Z in FIG. 2 is assumed to contain a bit pattern of "1111".

Since a four-bit system is inherently a hexadecimal (base sixteen) system, the four-bit binary combinations shown in FIG. 4 are, for simplicity, sometimes represented by their hexadecimal digit symbol. These hexadecimal (or "hex" for short) digit symbols are shown in the second column in FIG. 4. Thus, for example, the unique numerical data zone code "1111" is sometimes represented by the hex digit symbol "F".

One further preliminary matter should be considered, namely, the relative order of significance of the different bytes, digits and bits. As indicated in FIGS. 2 and 3, the bytes are numbered from left to right. The degree or order of significance, however, increases in the opposite direction, namely, from right to left. Thus, Byte 7 is the lowest order or least significant byte and Byte 0 is the highest order or most significant byte. This same type of numbering convention is also used for the digit fields and the bits within a byte. In particular, with respect to the bits within a byte, these bits are numbered from 0 through 7 running from left to right, with Bit 0 being the highest order bit and Bit 7 being the lowest order bit in the byte.

It is sometimes desired that the arithmetic operations performed by the ALU 39 be carried out with the data in a pure binary format. In such cases, the zoned format data supplied by the I/O device is first converted to the packed format and then the packed format data is converted to the pure binary format. In order to prepare the pure binary results for return to the I/O device, such results are first converted to the packed decimal format and then the packed decimal results are converted to the zoned decimal format. Since it has no particular bearing on the present invention, the matter of pure binary arithmetic operations will receive no further mention herein.

The zoned-to-packed and the packed-to-zoned conversion operations are initiated by means of specific program derived machine language instructions which are contained in the machine language version of the user application program residing in the main storage 17 when the program is being executed. In particular, a zoned-to-packed conversion operation is initiated by means of a machine language "pack" instruction having the format shown in FIG. 5. This instruction causes the format of the second operand to be changed from zoned to packed and the result of the conversion to be placed in the first operand location in the main storage 17. This is a storage-to-storage type instruction wherein the data to be converted is residing in the main storage 17 and the converted data is to be returned to the main storage 17. B2 and D2 are the base and displacement values which determine the main storage starting address for the second operand (the data to be converted) and B1 and D1 are the base and displacement values which determine the main storage starting address for the first operand (the storage location which is to receive the converted or packed data). L1 and L2 are four-bit operand length fields. L2+1 gives the length in bytes of the data segment to be converted and L1+1 gives the length in bytes of the storage location which is to receive the converted data. If the L1 length is too short to contain all significant digits of the converted L2 data, then the remaining higher order digits are ignored.

The reverse type of conversion operation, namely, the packed-to-zoned conversion operation, is initiated by means of a machine language "unpack" instruction having the format shown in FIG. 6. This format is the same as for the pack instruction and the various fields therein have the same significance except, of course, that a different unique op code value is used. The occurrence of this unpack instruction causes the second operand data to be fetched from the main storage 17, the format of such data to be changed from packed to zoned and the converted data to be placed in the first operand location in the main storage 17.

In existing present-day large-scale data processors, the packing and unpacking operations are accomplished by operating upon not more than one byte of data at a time. In, for example, the IBM System/360 Model 50 data processor manufactured and marketed by International Business Machines Corporation of Armonk, New York, the pack and unpack operations are executed by means of a pair of four byte wide working registers and a one byte wide mover unit that can manipulate data in half byte increments. In particular, the mover unit can gate either or both input half bytes straight through or can transpose either or both input half bytes to the opposite half byte output position. Four bytes of the data to be converted are fetched out of main storage and set into the first working register. The data in this first working register is then manipulated by the mover unit, one byte or one half byte at a time, and the output thereof is sent to the second working register to gradually build up the desired result in a step-by-step manner. With the exception of the byte containing the sign field, a separate machine cycle is required for each half byte digit field.

As a further example, the IBM System/370 Model 195 data processor manufactured by International Business Machines Corporation of Armonk, New York, makes use of a one byte wide digit shifter and a half byte wide skew register for performing the pack and unpack operations. The inputs of both of these elements are connected to a logic unit and their outputs are connected to a result bus. The digit shifter has the same characteristics as the mover unit in the System/360 Model 50 machine, while the skew register is used to store either the high order half byte or the low order half byte for transfer to the result bus on a subsequent machine cycle.

For other than the byte containing the sign field, a pack operation is accomplished in the Model 195 by gating a first byte of data to the logic unit from whence the low order half byte is placed in the skew register. During the following machine cycle, the next byte of data is gated through the logic unit to the digit shifter where the low order half byte is placed in the result bus high order half byte position and transferred along with the skew register contents (placed in the low order half byte result bus position) to a result register. This process is then repeated for each of the remaining pairs of unpacked data bytes, two machine cycles being required to build one result byte.

For unpack operations in the Model 195 and again ignoring the sign field byte, one byte at a time is transferred to the logic unit which then places the high order half byte in the skew register and the low order half byte in the low order half byte position on the result bus via the digit shifter. The high order half byte position of the result bus is supplied with a forced numerical character zone code. The resulting byte from the digit shifter is then sent to the result register. On the following cycle, the skew register is gated to the result bus low order half byte position and is transferred along with the forced high order half byte zone code to the result buffer. The remaining source word bytes are processed in a similar manner.

A primary purpose of the present invention is to provide new and improved data format converting apparatus for performing packing and unpacking operations in a much faster manner. This is accomplished by providing novel circuitry which enables the simultaneous packing or unpacking of multiple bytes of data. This eliminates the previously used byte-by-byte procedures and enables a given number of bytes to be packed or unpacked in a much smaller number of steps, thus substantially increasing the overall conversion speed.

In the preferred embodiment, it is a further purpose of this invention to obtain this increased format conversion speed with a relatively small increase in hardware cost. This is accomplished by adding a relatively small amount of additional circuitry to a byte shifter which is already present in the processor and which is already needed for other purposes, namely, the normal data shifting operations which are required in the processor. This is accomplished in the FIG. 1 embodiment by the functional unit 14 which is a combination data shifter and pack/unpack format converter for selectively enabling either normal data shifting operations or data packing operations or data unpacking operations.

Figure 7A:
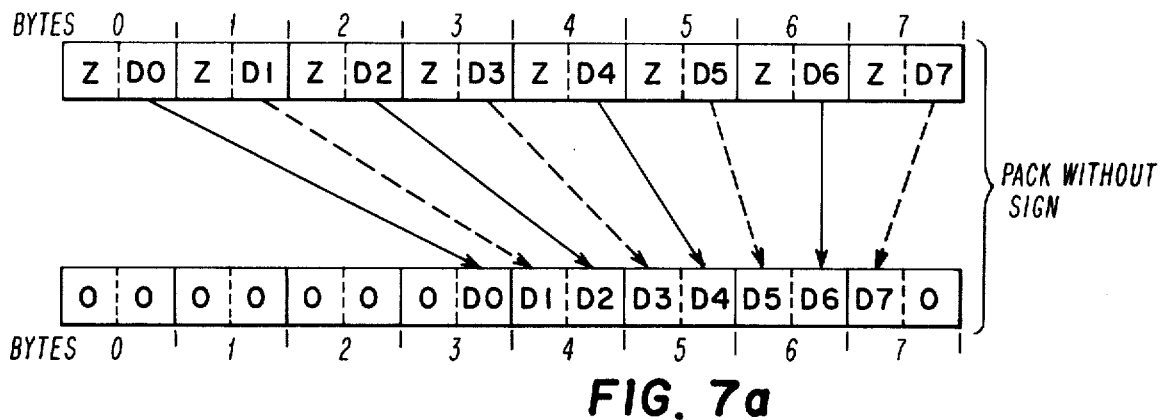
FIGS. 7a-7d are data sequence charts which are used to explain the manner in which zoned-decimal-to-packed-decimal conversion operations are carried out in accordance with a representative embodiment of the present invention.
Figure 7B:
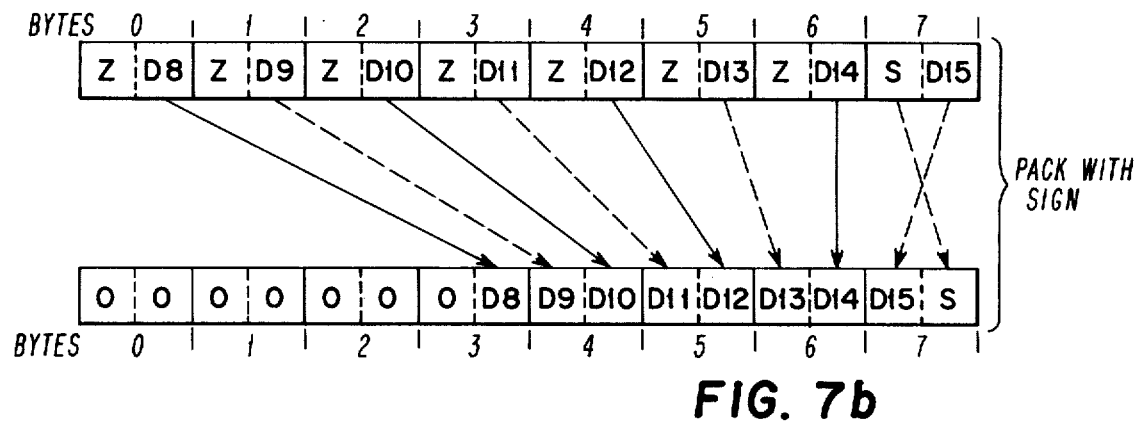

Referring now to FIGS. 7a–7d, these figures illustrate the data packing capability of the byte shifter and format converter 14. These figures are for the assumed case where it is desired to convert or pack sixteen bytes of zoned decimal data. In this case, the L2 length field in the pack instruction (FIG. 5) has a value of "1111" or "F". It is further assumed that there is no overlap of the L1 and L2 storage locations in the main storage 17 and that the L1 value in the pack instruction is also "F". Since the processor data flow is only eight bytes wide, these sixteen bytes must be handled eight bytes at a time. FIG. 7a represents the case for the higher order eight bytes and FIG. 7b represents the case for the lower order eight bytes.

Initially, the higher order eight bytes of zoned data are read from the main storage 17 and set into the A register 38. Then, during the next machine or microword cycle, the lower order eight bytes of zoned data are read from main storage 17 and set into a temporary holding register in the local store 25. During the next microword cycle, the higher order eight bytes in A register 38 are passed through the shifter/converter 14 which, at this time, is set to perform the pack without sign operation shown in FIG. 7a. This data in A register 38 is supplied to the shifter/converter 14 by way of assembler 29, data bus 34 and bit shifter 35, the latter being set for a zero shift or, in other words, a "straight" transfer of the data. The upper data sequence chart in FIG. 7a shows the zoned data on the shifter/converter input data bus 13 and the lower sequence chart in FIG. 7a shows the resulting packed data on the shifter/converter output data bus 15. The byte designations (Byte 0, Byte 1, Byte 2, etc.) refer to the conductors in the data buses 13 and 15 and not to the data fields in the data being processed. The resulting packed data appearing at the output of shifter/converter 14 is set into a local storage register in local store 25, which register, for sake of a name, will be referred to as "LS1".

The remaining or lower order eight bytes of data are converted to the packed format during the next microword cycle. In particular, these bytes are read from the temporary holding register in local store 25 and are supplied by way of A register 38, assembler 29 and bit shifter 35 (zero shift) to the shifter/converter 14. Shifter/converter 14 at this time performs the pack with sign operation illustrated in FIG. 7b and the packed result is set into a second local storage register LS2 in the local store 25. The upper sequence chart in FIG. 7b shows the zoned data on the shifter/converter input data bus 13 and the lower sequence chart shows the resulting packed data on the shifter/converter output data bus 15.

From a hardware standpoint, the only difference between the packing operations of FIGS. 7a and 7b is the additional provision which needs to be made to handle the sign field S in the FIG. 7b case.

Figure 7C:
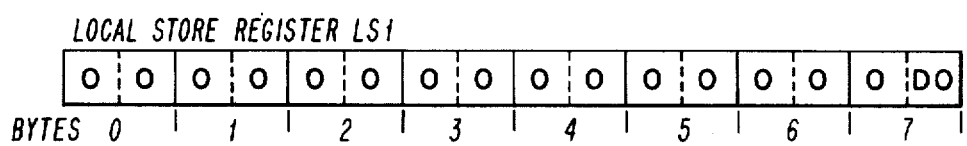
Figure 7D:
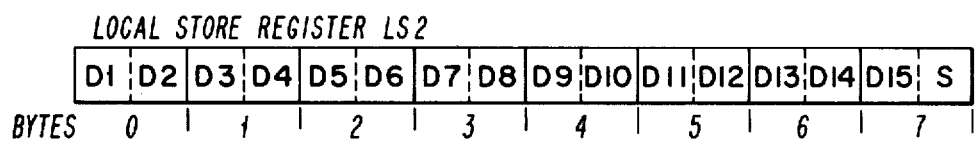

The packed data in local storage registers LS1 and LS2 is then adjusted to obtain the results shown in FIGS. 7c and 7d. In particular, the data in LS1 is shifted four bytes to the left using a wrap around shifting mode, after which the higher order portion of the shifted data is merged with the data in LS2 to produce the result shown in FIG. 7d. The shifted data, with the higher order portion set to zero, is then put back into LS1 to produce the result shown in FIG. 7c. Thereafter, during the next two microword cycles, the contents of LS1 and LS2 are written into the main storage 17 starting at the location determined by the B1 and D1 fields in the pack instruction. This completes the execution of the pack instruction for the assumed example.

If the L1 length value in the pack instruction is too short to enable storage of all significant digits of the packed result, then the remaining higher order result digits are ignored. Also, if L1 is not greater than seven (data length not greater than eight bytes), then only the result data in the local storage register LS2 is put back into the main storage 17. Further, if the L2 length value for the original data is not greater than seven (data length not greater than eight bytes), then only the pack with sign conversion operation of FIG. 7b need be performed, with local storage register LS2 being used for the packed result.

Figure 8A:
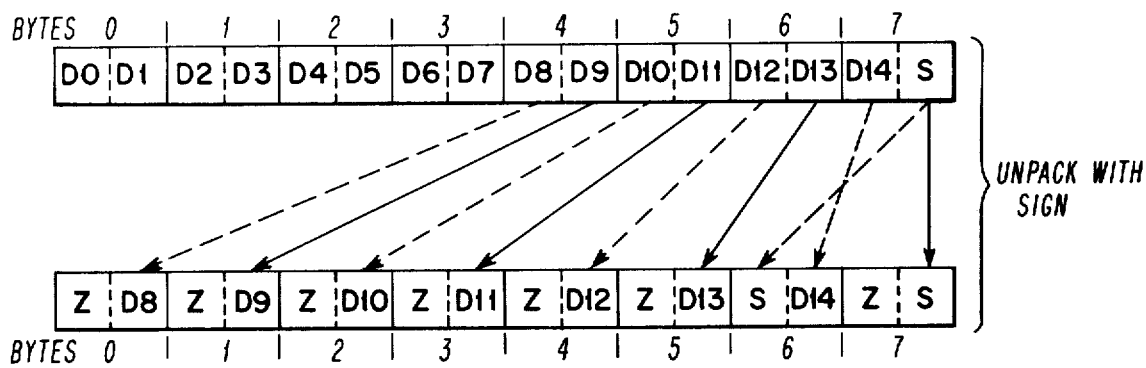
FIGS. 8a-8d are data sequence charts which are used to explain the manner in which packed-decimal-to-zoned-decimal conversion operations are carried out in accordance with a representative embodiment of the present invention.

Referring now to FIGS. 8a–8d, the converse situation where data is to be converted from a packed decimal format to a zoned decimal format will be considered. For the illustrated example, it is assumed that eight bytes of data are to be unpacked, that there is no overlap of the L1 and L2 main store locations and that the L1 value is set for a result storage length of 16 bytes. With this in mind, the eight bytes of data specified by the unpack instruction are read from the main storage 17 and set into the A register 38 during a first microword cycle. During the next microword cycle, the data in A register 38 is passed through the shifter/converter 14 a first time to produce the result shown in FIG. 8a. In this case, the shifter/converter 14 is set to provide an unpack with sign operation. The upper sequence chart in FIG. 8a shows the packed data on shifter/converter input bus 13 and the lower sequence chart shows the zoned result data on the shifter/converter output bus 15. This result data is set into the LS2 register in local store 25. The byte 7 part of this result data is of no significance and will be subsequently eliminated.

Figure 8B:
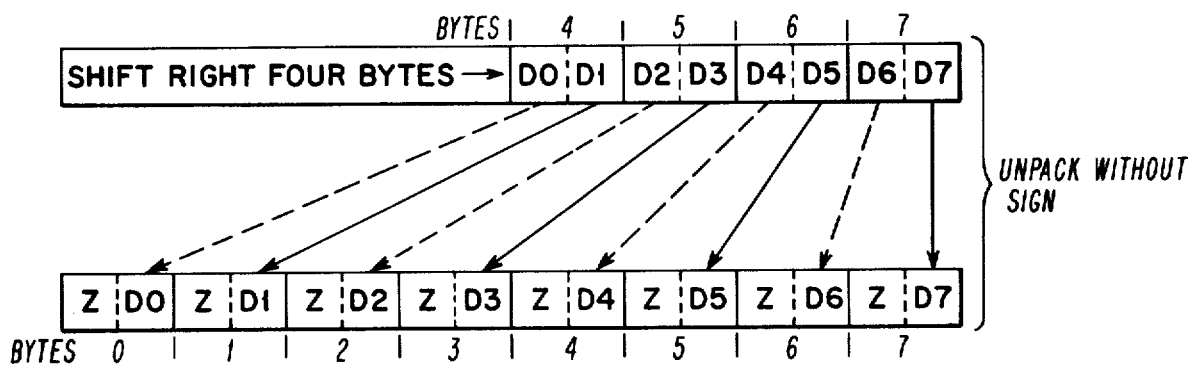

In order to unpack the remainder of the data, it is necessary to pass the packed data in the A register 38 through the shifter/converter 14 a second time during a further microword cycle to produce the result shown in FIG. 8b. In this case, the upper sequence chart does not represent the data on the shifter/converter input bus 13. For this unpack without sign operation, the shifter/converter 14 is made to do two things. First, it is made to shift the data four bytes to the right. Then it is made to perform the unpack without sign operation on this shifted data. The circuitry is such that both of these functions can be accomplished internally within the shifter/converter 14. The upper sequence chart in FIG. 8b represents the portion of the data of interest after this internal four byte right shift but before the performance of the unpack operation. FIG. 8b is shown this way to emphasize the fact that, except for the handling of the sign field S, the same hardware is used to do the unpacking in the FIG. 8b case as was used in the first pass case of FIG. 8a. The result of the unpack without sign operation of FIG. 8b is set into the LS1 register in local store 25.

Figure 8C:
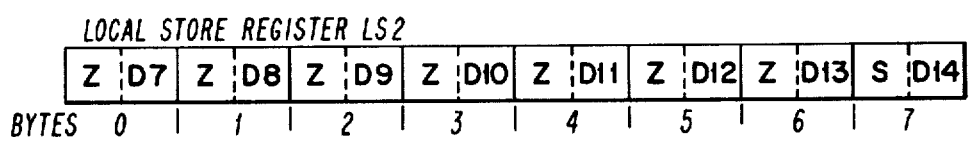
Figure 8D:
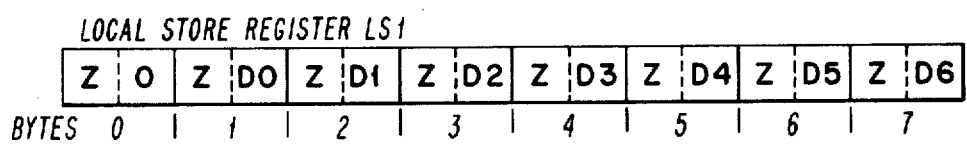

The resulting zoned data in the local storage registers LS1 and LS2 is thereafter manipulated to obtain the conditions shown in FIGS. 8c and 8d. In particular, the data in each of the local storage registers LS1 and LS2 is right shifted by one byte using a wrap around type shifting action such that the original low order byte becomes the high order byte. Byte 0 of the shifted LS1 data is then merged with Bytes 1–7 of the shifted LS2 data and the result stored back into LS2 to produce therein the condition shown in FIG. 8c. In a converse manner, Byte 0 of the shifted LS2 data is merged with Bytes 1–7 of the shifted LS1 data and the result put back into LS1 (with the low order four-bit field of Byte 0 set to zero) to produce the condition shown in FIG. 8d. Thereafter, during the next two microword cycles, the contents of LS1 and LS2 are transferred to the main storage 17 one register at a time and stored at locations therein commencing with the byte location determined by the B1 and D1 values in the unpack instruction. This completes the execution of the unpack instruction for the assumed example.

Since the maximum result storage length that can be specified by the L1 value of the unpack instruction is sixteen bytes, it is apparent from FIGS. 8a–8d that the largest amount of packed data that can be unpacked and stored with a single unpack instruction is eight bytes. If the L2 length value in the unpack instruction should indicate a data length greater than eight bytes, then the remaining high order bytes in excess of eight are ignored. Similarly, if for any other reason the L1 result storage length value is too short to contain all significant bytes of the unpacked data, the excess higher order bytes are ignored. Further, if the L1 value indicates a result storage length of eight bytes or less, then only the result data in local storage register LS2 is put back into the main storage 17.

Referring now to FIGS. 9 and 10, there will be discussed the troublesome bit crossover problem which had to be solved in order to obtain the hereindescribed embodiment of the invention. FIG. 9 shows in greater detail the nature of the conversion action needed for Byte 0 in FIG. 7a, while FIG. 10 shows in greater detail the conversion action needed for Byte 1 of FIG. 7a. As indicated by FIG. 9, Bits 4-7 of Byte 0 need to be shifted so as to appear as Bits 4-7 of Byte 3. Thus, each bit is merely shifted an integral or whole number of bytes. As indicated in FIG. 10, Bit 4 of Byte 1 must be shifted or manipulated so as to become Bit 0 of Byte 4, Bit 5 of Byte 1 must be manipulated so as to become Bit 1 of Byte 4, and so forth. In other words, the four low order bits (Bits 4-7) of Byte 1 must cross over and become the four high order bits (Bits 0-3) of Byte 4. In terms of digit positions, the low order digit (Bits 4-7) of Byte 1 must cross over and become the high order digit (Bits 0-3) of Byte 4.

In FIGS. 7a and 7b, the noncrossover cases are represented by the solid lines which connect the upper and lower sequence charts, while the bit crossover cases are represented by the broken lines which interconnect the upper and lower sequence charts. As seen from either of these figures, the noncrossover and crossover cases alternate in occurrence as one moves down the row of input bytes. Also, as indicated in FIG. 7b, the sign field S represents a further crossover case, but in the opposite direction, namely, from a high order digit position to a low order digit position.

As indicated in FIGS. 8a and 8b, the bit or digit crossover problem is also encountered in the unpacking operations, as is indicated by the broken lines interconnecting the upper and lower sequence charts. In this case, however, and except for the sign field S, the direction of crossover is opposite to that shown in FIG. 10. In particular, the high order digits (Bits 0-3) cross over to the low order digit (Bits 4-7) positions. For the sign field S in FIG. 8a, the crossover direction is from low to high, this being the Byte 7 to Byte 6 crossover. As previously indicated, Byte 7 of the lower sequence chart in FIG. 8a is of no significance from a data standpoint. From a hardware standpoint, the connection is made to Byte 7 so that the same hardware can be used for this byte for both the unpack with sign and the unpack without sign case.

These low order to high order and high order to low order bit crossovers present a serious obstacle to the realization of a combined data shifter and format converter apparatus, particularly where such apparatus is to be implemented in the form of large-scale integration (LSI) circuitry by means of integrated circuit chips.

Referring to FIG. 11, there is shown a preferred manner of construction for the byte shifter and format converter 14 of FIG. 1. Among other things, this FIG. 11 embodiment provides a unique and highly advantageous solution to the troublesome bit crossover problem. To this end, the apparatus of FIG. 11 includes a first integrated circuit chip 42 for receiving and processing the first (Bit 0) and fifth (Bit 4) data bits of each of the eight data bytes on the shifter/converter input data bus 13. The FIG. 11 apparatus further includes a second integrated circuit chip 43 for receiving and processing the second (Bit 1) and sixth (Bit 5) data bits of each of the eight data bytes on input bus 13. The shifter/converter apparatus 14 also includes a third integrated circuit chip 44 for receiving and processing the third (Bit 2) and seventh (Bit 6) data bits of each of the eight data bytes on the input bus 13. The shifter/converter 14 further includes a fourth integrated circuit chip 45 for receiving and processing the fourth (Bit 3) and eighth (Bit 7) data bits of each of the eight data bytes on the input data bus 13. The eight parity check bits are received and processed by circuitry located on a further integrated circuit chip 46.

Each of the input conductor groups 13a-13i includes a set of eight conductors for simultaneously passing the proper ones of the data bits and parity bits on the input bus 13 to the proper ones of the different integrated circuit chips 42-46. For example, conductor group 13a simultaneously supplies the Bit 0 bits of each of the eight data bytes to the integrated circuit chip 42 and the conductor group 13e does the same for the Bit 4 bits. Similarly, each of the output conductor groups 15a-15i includes a set of eight conductors for passing data bits and parity bits from the integrated circuit chips 42-46 to the output data bus 15. Input conductor groups 13a-13i represent subgroups of the conductors in the input bus 13 and output conductor groups 15a-15i represent subgroups of the conductors in the output data bus 15.

Each of the data handling integrated circuit chips 42-45 includes shifter circuitry for simultaneously shifting its data bits, first format conversion circuitry for simultaneously adjusting the relative positions of selected ones of its data bits in the manner needed to obtain a zoned-decimal-to-packed-decimal conversion and second format conversion circuitry for simultaneously adjusting the relative positions of selected ones of its data bits in the manner needed to obtain a packed-decimal-to-zoned decimal conversion. Each of the integrated circuit chips 42-45 also includes control circuitry for selectively enabling at any given moment only one of the shifter circuitry, the first format conversion circuitry and the second format conversion circuitry located on such chip. This control circuitry is controlled by means of control signals which are supplied to each of the integrated circuit chips 42-45 by means of control signal buses 47, 48 and 49. These control buses 47, 48 and 49 run from the shifter control unit 41 (FIG. 1) which provides the appropriate control signals for these buses.

The shift control bus 47 is comprised of four conductors, three of which convey a coded three-bit shift amount signal and the fourth of which conveys a left-/right shift direction signal. The pad flag control bus 48 is comprised of eight conductors, one for each of the eight data bytes, for identifying the bytes which are to be padded with zeros or, alternatively, with ones. The pack/unpack control bus 49 is comprised of three conductors which convey a three-bit signal that is coded to indicate which of the following operations is required of the shifter/converter chips 42-45: a shift operation, a pack with sign operation, a pack without sign operation, an unpack with sign operation and an unpack without sign operation.

The unique groupings of the circuits for the different data bits on the different integrated circuit chips 42-45 enable the packing and unpacking of multiple bytes of data with integrated circuit chips having a minimum number of chip input/output connections. If, for example, the circuitry for the Bit 4 bits is not packaged on the same integrated circuit chip as the circuitry for the Bit 0 bits, then, for the case of an eight byte data flow, it would be necessary to run eight conductors between the Bit 0 chip and the Bit 4 chip to enable the bit crossovers which are needed to perform the packing and unpacking operations. This would require eight additional input/output connections on each of the Bit 0 and Bit 4 chips.

By using the approach shown in FIG. 11 of packaging the corresponding bits of the high order and low order half bytes on the same chip, the need for these interchip conductors and associated chip input/output connections is eliminated. In other words, when the circuits for the first bits in the high order half bytes, namely, the Bit 0 bits, are packaged on the same integrated circuit chip 42 as are the circuits for the first bits in the low order half bytes, namely, the Bit 4 bits, then the needed Bit 0 to Bit 4 and Bit 4 to Bit 0 crossovers can be accomplished without leaving the confines of the chip, thereby eliminating the need for additional chip input/output connections. Similar considerations apply for the other pairings of corresponding high order and low order half byte bits shown in FIG. 11 for the other integrated circuit chips 43, 44 and 45.

The circuitry located on each of the four integrated circuit chips 42-45 is of the same construction, the only difference from one chip to the next being in the choice of the particular input data bus and output data bus conductors which are connected to the chip. Thus, it is sufficient for purposes of explanation herein to consider in detail the circuitry on only one of the chips, for example, the chip 45.

Referring to FIG. 12, there is shown in greater detail the construction of the circuitry located on the integrated circuit chip 45. For normal data shifting operations, the Bit 3 bits moves from the input data bus 13 to the output data bus 15 by way of conductor group 13d, a first level bytes shifter 50, conductor group 51, a second level byte shifter 52 and conductor group 15d. In a parallel manner, the Bit 7 bits move from the input data bus 13 to the output data bus 15 by way of conductor group 13h, a first level byte shifter 53, conductor group 54, a second level byte shifter 55 and conductor group 15h. For normal data shifting operations, each of the first level shifters 50 and 53 is capable of providing a right shift of zero (no shift), one, two or three bytes. The second level shifters 52 and 55 are capable of providing a right shift or either zero (no shift) or four bytes. Thus, in combination, the first and second level shifters 50 and 52 for the Bit 3 bits are capable of providing a right shift of anywhere from zero to seven bytes. The same is true for the Bit 7 first and second level shifters 53 and 55.

The amount of shift, if any, provided by shifters 50, 52, 53 and 55 is controlled by the binary signal levels on the output lines from a shift amount decoder 56 which receives and decodes the binary coded information on the shift control bus 47. The legends on the output lines of the decoder 56 have the following significance. R0 denotes a right shift of zero bytes (no shift) for the first level shifters, R1 denotes a right shift of one byte, R2 denotes a right shift of two bytes, R3 denotes a right shift of three bytes and R4 denotes a right shift of four bytes. R00 denotes a right shift of zero bytes (no shift) for the second level byte shifters 52 and 55. Separate zero signals are needed for the two levels because the shift amounts for the two levels are not necessarily zero at the same time. The R0-R3 lines provide the normal shift control for the first level shifters 50 and 53 and only one of these R0-R3 lines can be at the active level during any given data shifting operation. The R00 and R4 lines control the shifting action in the second level shifters 52 and 55 and only one of these R00 and R4 lines can be at the active level during any given data shifting operation. In other words, at any given moment, one of the R0-R3 lines will be at the active level and one of the R00 and R4 lines will also be at the active level. The active level identifies the amount of shift to be made.

As indicated in FIG. 12, the R4 lines is also connected to the first level shifters 50 and 53. This is done to provide a four byte right shift in each of the first level shifters 50 and 53 when performing an unpack without sign format conversion operation (see FIG. 8b). This R4 line is not used by the first level shifters 50 and 53 when performing normal data shifting operations.

Ignoring for the moment the effect of the pad flags on pad flag control bus 48, the shifter circuitry described herein is of the wrap-around type such that data bits shifted out of one end of the shifter reappear and enter at the other end of the shifter. Actually, it is a ring type mechanism which does not have any "ends". In other words, the data is shifted in a circular manner such that all data bits are always present at some point around the circle. Because of this circular or wrap-around shifting action, data shifts to the left are accomplished by instead making a complementary data shift to the right. For the case of an eight byte shifter, the relationship between left and right shifts is as follows:

| LEFT SHIFT | RIGHT SHIFT |
| --- | --- |
| 1 | 7 |
| 2 | 6 |
| 3 | 5 |
| 4 | 4 |
| 5 | 3 |
| 6 | 2 |
| 7 | 1 |

The purpose of the pad flags F0 through F7 on control bus 48 is to made the shifter look like a linear shifter having a left-hand end and a right-hand end. Assuming the case of padding with zeros, the pad flags on control bus 48 are used to set to zero those shifter output byte positions which correspond to the byte positions in a two-ended shifter that would be left vacant when the original data is shifted a given amount in a given direction. This simulates the loss of data that would occur because of the shifting of data out of the end of a two-ended shifter. For example, if the shifter originally contains eight bytes of data (for example, 12345678) and such data is shifted three bytes to the right, then the pad flags operate to fill the three shifter output byte positions to the left of the shifted data with all zeros (for the given example, 00012345).

The padding, when used, is applied in the second level shifters 52 and 55. To this end, the eight pad flag signals on pad flag bus 48 are inverted by a set of eight NOT circuits 59 to produce inverted pad flags $\overline{F0}$ through $\overline{F7}$. The inverted pad flags $\overline{F0}$-$\overline{F7}$ are supplied to each of the second level shifters 52 and 55. If a given byte is to be padded, for example Byte 3, then its pad flag F3 is set to the one level which, in turn, causes its inverted pad flag F̄3 to assume the zero level. As will be seen, this causes the Byte 3 output bit positions of shifters 52 and 55 to be set to zero.

The circuitry for performing the packing and unpacking format conversion operations is located in the second level byte shifters 52 and 55. The necessary Bit 3 to Bit 7 and Bit 7 to Bit 3 crossovers are provided by means of the eight conductors in a crossover conductor group 57. Except for the unpack without sign case, the first level byte shifters 50 and 53 are set to provide a zero shift when a pack or unpack operation is being performed. In the exceptional unpack without sign case, the first level shifters 50 and 53 are, as mentioned, set to provide a right shift of four bytes.

The choice as to what kind of operation is to be performed by the second level byte shifters 52 and 55 is controlled by a pack/unpack control decoder 58 which receives and decodes the three-bit coded control signal supplied by way of control bus 49. In the illustrated embodiment, the pack/unpack control decoder 58 has five output control lines 60–64, only one of which can be at the active level for any given shifting or format converting operation. The control line 60 is active when it is desired to perform a normal data shifting operation. The control line 61 is active when it is desired to perform a pack with sign operation. Control line 62 is active when it is desired to perform a pack without sign operation. Control line 63 is active when it is desired to perform an unpack with sign operation. Control line 64 is active when it is desired to perform an unpack without sign operation. Control lines 61 and 62 are connected to an OR circuit 65 to produce on the OR circuit output line 66 a generic pack signal when either of control lines 61 and 62 is active. In a similar manner, control lines 63 and 64 are connected to an OR circuit 67 to produce a generic unpack signal on a control line 68 when either of control lines 63 and 64 is at the active level. The control lines 60, 61, 63, 64, 66 and 68 are connected to each of the second level byte shifters 52 and 55 to control the type of operation to be performed therein. In addition, the control line 64 is connected to each of the first level byte shifters 50 and 53 to enable the special four byte right shift when performing an unpack without sign operation.

The shift control, pad flag and pack/unpack control signals on control buses 47, 48 and 49 are obtained from the shifter control unit 41 of FIG. 1. This shifter control unit 41, in turn, receives most of its information from the control register 21, such information being available when a shift type microword is residing in the control register 21. A representative format for such a shift type microword is shown in FIG. 13. One such shift type microword is issued by the control store 20 each time it is desired that the byte shifter and format converter 14 perform either a normal data shifting operation or one of the four possible pack/unpack operations.

When performing a normal data shifting operation, the result control field and the source/result address field in the shift microword are used to identify the location of the source data (the data to be operated on) and the location to which the result is to be sent. When performing one of the pack or unpack operations, the result control field is coded to indicate that a format conversion operation is to be performed and that the source data is in the A register 38. The source/result address field is coded to identify the location to which the output data from shifter/converter 14 is to be sent. In particular, the source/result address field is coded to indicate the address of either the LS1 or the LS2 local storage register in local store 25, depending upon whether the pack/unpack operation is "without sign" or "with sign".

For normal data shifting operations, the R/L (right-/left) bit in the shift microword indicates the direction of shift and, except for shift type machine instructions, the shift amount field specifies the amount of the shift. For shift type machine instructions, the shift amount is contained in the instruction itself and the shifter control unit 41 takes this information from the instruction register 26 and not from the microword in the control register 21. The IA (indirect amount) bit in the microword designates whether the shift amount is to be taken from the microword or from the instruction in the instruction register 26. For the case of a pack or unpack operation, the IA bit is set to indicate that the shift amount is to be taken from the microword and the shift amount field in the microword is coded to contain all zeros, except for the case of an unpack without sign operation. For the latter case, the byte portion of the microword shift amount field is set to indicate a shift of four bytes and the bit portion is set to all zeros. Also, the R/L bit is set to indicate a right shift.

The shift and pack/unpack control field of the shift microword is a three-bit control field which provides the coded pack/unpack control signal for the control bus 49 of FIG. 12. This control field is coded in accordance with the type of operation that is desired for the particular shift microword being considered. The eight possible code combinations for this three-bit field may, for example, be assigned the following meanings:

| Shift & Pack/Unpack Control Field | |
|---|---|
| Code | Operation |
| 000 | Shift - Wrap mode |
| 001 | Shift - Pad zeros |
| 010 | Shift - Pad ones |
| 011 | Shift - Propagate sign |
| 100 | Pack with sign |
| 101 | Pack without sign |
| 110 | Unpack with sign |
| 111 | Unpack without sign |

This three-bit control field is received by the shifter control unit 41 and is passed on to the shifter/converter 14 by the control bus 49. The occurrence of any one of the first four code values will cause the decoder 58 (FIG. 12) to activate the shift line 60. The last four code values control the activation of the decoder output lines 61–64. The wrap mode shift is accomplished by disabling the pad flags in the shifter control unit 41. In particular, the eight pad flag lines in the control bus 48 are set to zero. This disables the padding operation so that the shifter output data can reflect the basic wrap mode construction of the shifter circuitry. For simplicity, the "pad ones" and "propagate sign" shift cases will not be discussed herein.

A preferred form of construction for the shifter control unit 41 is described in the above-referenced technical article by Shimp and Sliz. Among other things, this technical article goes into considerable detail on the generation of the byte pad flags F0-F7. As there indicated, these byte pad flags are derived from the information contained in the R/L field and the byte portion of the shift amount field of the shift type microword.

This technical article does not, of course, make any mention of the pack/unpack features being described in the present patent application.

Considering briefly the use of the shift microwords in the performance of the format conversion operations, a first shift microword having a pack/unpack control field code of "101" is issued to perform the pack without sign operation of FIG. 7a. Thereafter, a second shift microword having a pack/unpack control field code of "100" is issued to perform the pack with sign operation of FIG. 7b. For the unpack operations, the first shift microword contains one of the "110" and "111" codes and the second shift microword contains the other of these codes. In other words, a different microword is used for each of the FIG. 7a, FIG. 7b, FIG. 8a and FIG. 8b cases.

Figure 14:
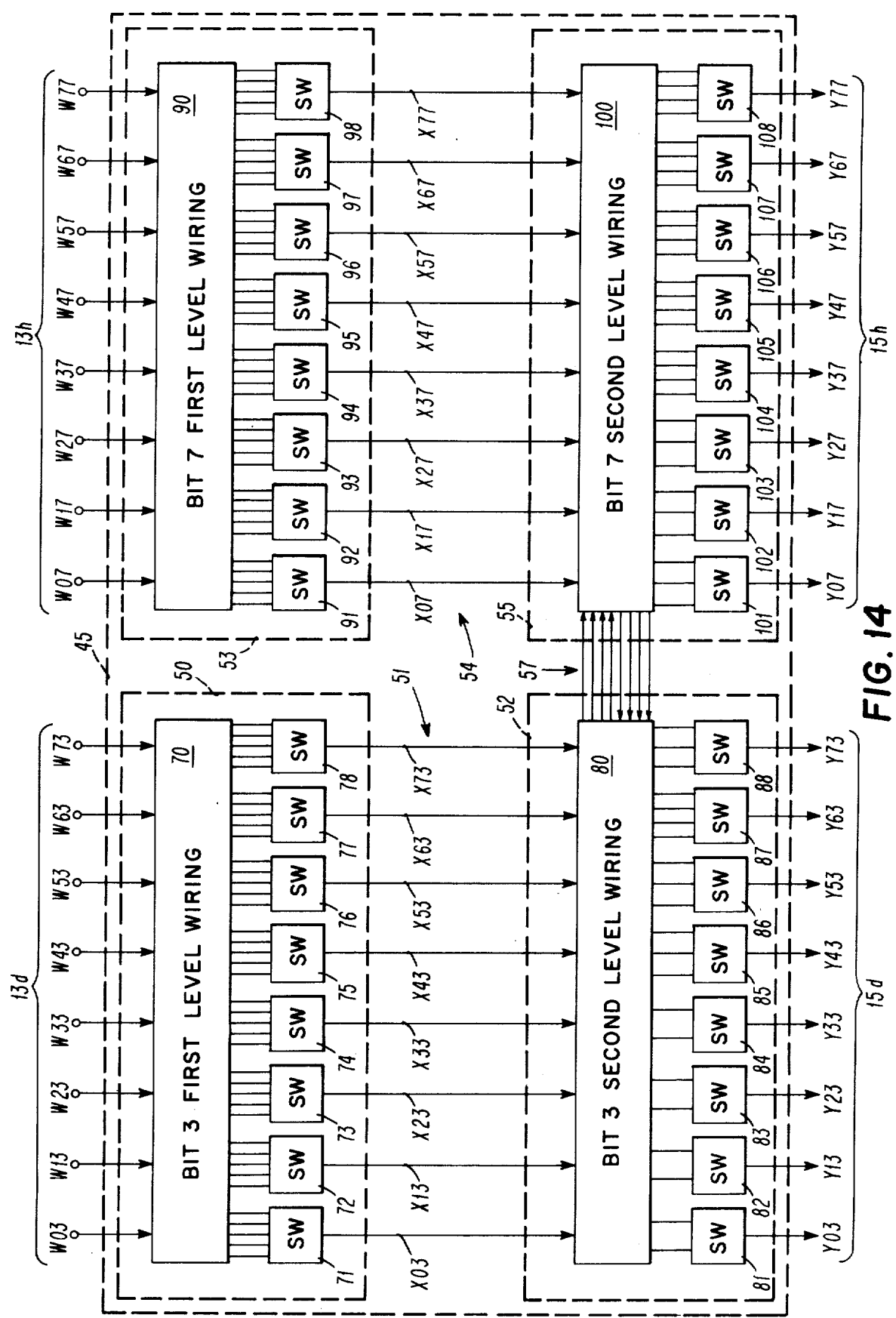
FIG. 14 is the same as FIG. 12 except that the control lines and control circuitry have been omitted for simplicity and the data lines and data circuitry have been shown in greater detail.

Referring now to FIG. 14, there is shown in greater detail the construction of the data handling portions of the circuitry on the integrated circuit chip 45. FIG. 14 is the same as FIG. 12 except that the control lines and control circuitry have been omitted for sake of simplicity and the data lines and data circuitry have been shown in greater detail. As seen in FIG. 14, the Bit 3 first level byte shifter 50 includes first level wiring 70 and a set of eight switching logic elements 71-78. The first level wiring 70 serves to couple the different ones of the eight Bit 3 conductors W03, W13, W23, etc., in the shifter/converter input data bus 13 to various ones of the switching logic elements 71-78. The output of each of the switching logic elements 71-78 is coupled to a different one of the eight conductors X03, X13, X23, etc., in the interlevel conductor group 51.

The Bit 3 second level byte shifter 52 includes second level wiring 80 and a set of eight switching logic elements 81-88. The second level wiring 80 serves to couple the different ones of the interlevel conductors X03, X13, etc., to various ones of the switching elements 81-88. The output of each of the switching elements 81-88 is connected to a different one of the eight Bit 3 conductors Y03, Y13, etc., in the shifter/converter output data bus 15.

The Bit 7 first level byte shifter 53 includes first level wiring 90 and a set of eight switching logic elements 91-98. The Bit 7 second level byte shifter 55 includes second level wiring 100 and a set of eight switching logic elements 101-108. The bit crossover conductors 57 are used when performing packing and unpacking operations to enable certain ones of the Bit 3 data bits to appear on certain ones of the Bit 7 second level output conductors Y07, Y17, etc., and conversely, to enable certain ones of the Bit 7 data bits to appear on certain ones of the Bit 3 second level output lines Y03, Y13, etc.

With respect to the conductor legends used in FIG. 14, the letter W is used for the conductors in the shifter/converter input data bus 13, the letter X is used for the conductors in the interlevel conductor groups and the letter Y is used for the conductors in the shifter/converter output data bus 15. The left-hand number in each conductor legend is the byte number and the right-hand number is the bit number. Thus, for example, W43 denotes the Byte 4 Bit 3 conductor in the input data bus 13. Similarly, X67 denotes the Byte 6 Bit 7 conductor in the interlevel conductor groups. These byte and bit numbers in the conductor legends identify hardware locations and not data bits in the data being processed.

Figure 15:
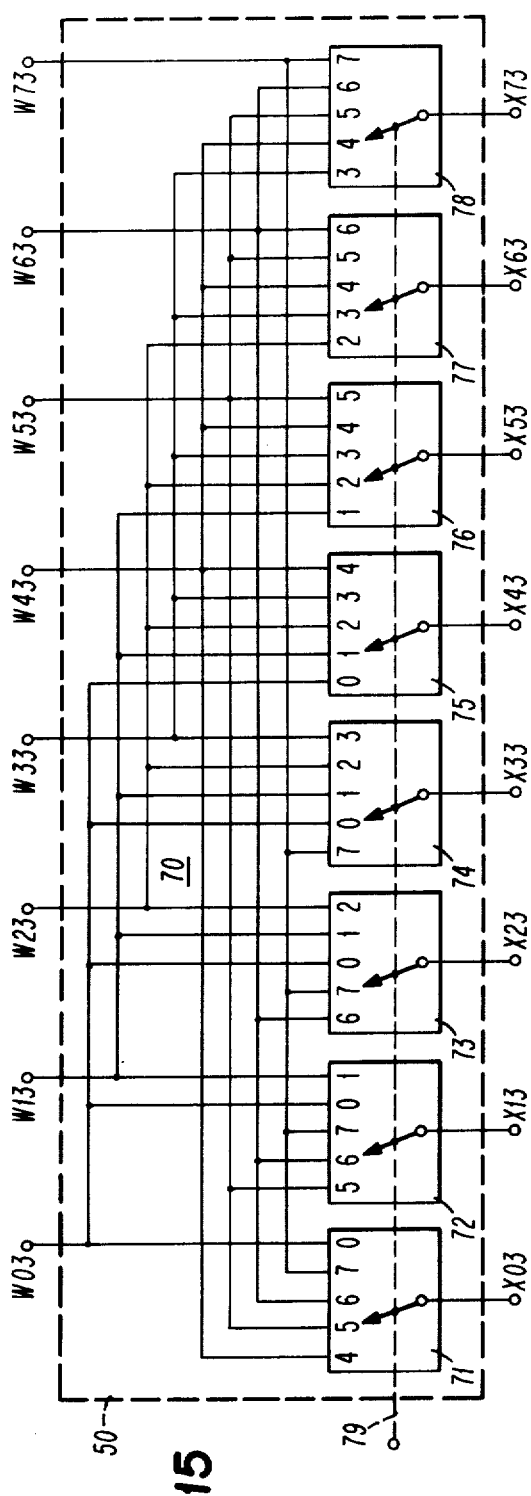
FIG. 15 shows in greater detail the construction of the Bit 3 first level byte shifter of FIGS. 12 and 14 with certain switching logic elements (SW in FIG. 14) being represented in an analogous manner.

Referring now to FIG. 15, there is shown in greater detail the construction of the Bit 3 first level byte shifter 50. FIG. 15 shows both the first level wiring 70 and the switching logic elements 71-78, the latter being represented by an electromechanical analogy purely for simplicity of explanation. The switch settings shown in FIG. 15 are for the case of a three byte shift to the right. If the data byte sequence on the input conductors W03, W13, etc., is "01234567", then the data byte sequence on the output conductors X03, X13, etc., becomes "56701234" for the switch setting shown. Thus, each Bit 3 bit is shifted three byte positions to the right. This example also illustrates the inherent wrap-around nature of the shifter circuitry. The mechanical switch setting linkage 79 shown in FIG. 15 represents the switch control action of the R0-R4 shift amount lines which, as indicated in FIG. 12, run to the first level shifter 50 to control the switching action therein.

Figure 16:
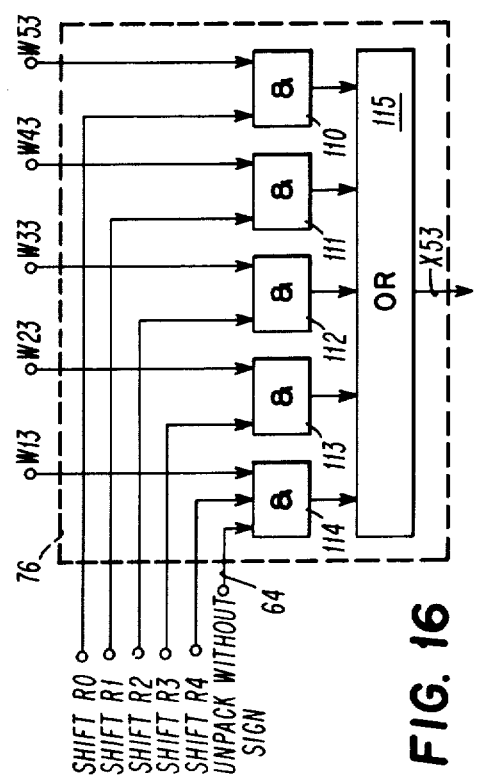
FIG. 16 shows the actual logic circuitry for one of the FIG. 15 switching logic elements.

Referring to FIG. 16, there is shown the actual logic circuit construction of one of the switching logic elements 71-78 in the Bit 3 first level shifter 50, namely, the switching logic element 76. This switching logic element 76 includes a set of five AND circuits 110-114 having their outputs connected to an OR circuit 115, the output of which is connected to the interlevel conductor X53. Only one of these AND circuits 110-114 is enabled during any given shift or pack/unpack operation, the remainder being disabled. The enabled AND gate is the one whose shift amount control line is at the active (binary one) level. Thus: for a right shift of zero (R0=1), the AND gate 110 is enabled; for a right shift of one (R1=1), the AND gate 111 is enabled; and so forth. Enabling the AND circuit 110 couples the W53 input conductor to the X53 output conductor, which is the desired result for the no shift case. In a similar manner, the enabling of a selected one of AND circuits 111-114 causes a coupling of the respective one of input conductors W43, W33, W23 and W13 to the output conductor X53.

The unpack without sign control line 64 is connected to the AND circuit 114 so that a right shift of four bytes can occur in the first level shifter only when doing an unpack without sign format conversion operation. Thus, this four byte first level shift is disabled for normal data shifting operations.

Each of the other Bit 3 switching logic elements 71-75, 77 and 78 shown in FIGS. 14 and 15 is of the same form of construction as shown in FIG. 16.

The Bit 7 first level byte shifter 53 of FIGS. 12 and 14 is of the same form of construction as that shown in FIGS. 15 and 16 for the Bit 3 first level shifter 50. Furthermore, each of the two first level shifters on each of the other integrated circuit chips 42, 43 and 44 is also of this same FIG. 15/FIG. 16 form of construction.

Figure 17:
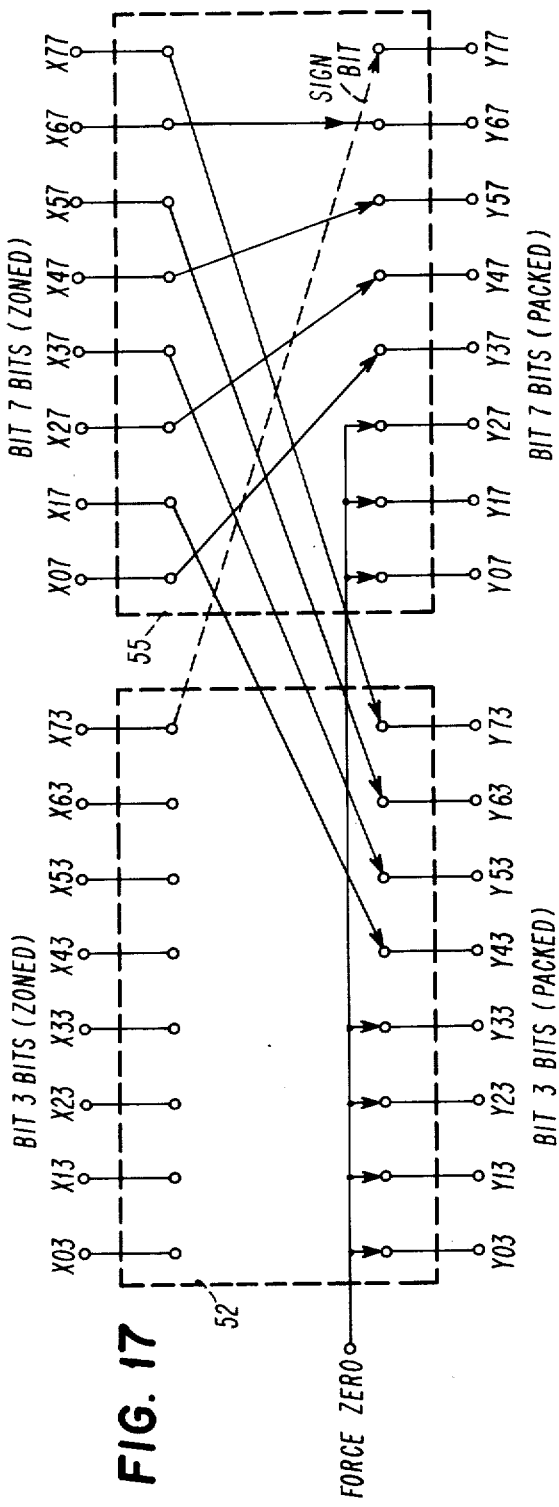
FIG. 17 is an interconnection diagram showing the input to output interconnections which are established in the second level byte shifters of FIG. 14 when performing a zoned-to-packed conversion operation.

Considering now the second level byte shifters 52 and 55, it is noted that these second level shifters include not only the normal shifting circuitry, but also the circuitry needed to accomplish the packing and unpacking operations. Referring to FIG. 17, there is shown an interconnection diagram showing the input-to-output couplings or connections needed in the second level shifters 52 and 55 in order to accomplish the pack without sign and the pack with sign operations of FIGS. 7a and 7b, respectively. These connections can be verified by comparing FIG. 17 with FIGS. 7a and 7b. Except for the sign field bit, the connections are the same for both the "with sign" case and the "without sign" case. When doing a pack with sign operation, the sign bit is accommodated by connecting the X73 input line to the Y77 output line. When doing a pack without sign operation, this connection is not made and the Y77 output line is instead forced to zero. Other than this, the interconnections are the same for the two different pack cases.

Figure 18:
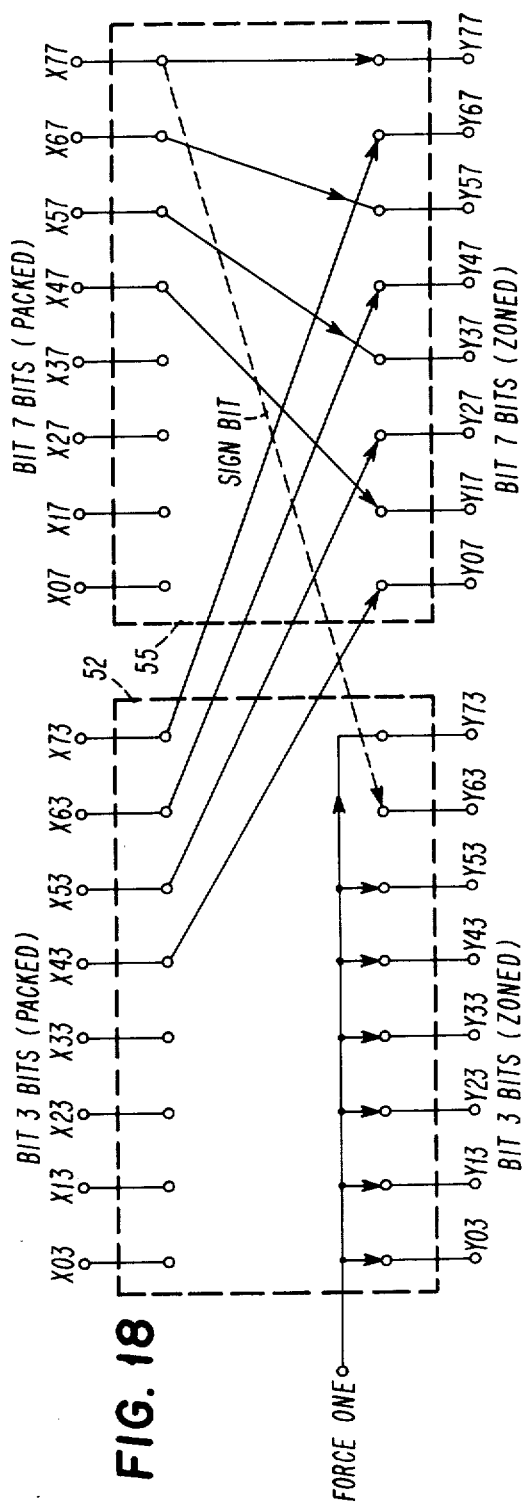
FIG. 18 is the corresponding second level interconnection diagram for the case where a packed-to-zoned conversion operation is being performed.

Referring to FIG. 18, there is shown a further interconnection diagram showing the input-to-output couplings or connections needed for the second level shifters 52 and 55 in order to perform the unpack with sign and unpack without sign operations of FIGS. 8a and 8b, respectively. Except for the handling of the sign field bit, the input/output connections are the same for both unpack cases. For the unpack with sign case, the sign bit is accommodated by coupling the input conductor X77 to the output conductor Y63. For the unpack without sign case, this connection is not made and the output conductor Y63 is instead forced to a binary one level. The forcing of the Bit 3 output lines Y03, Y13, etc., to the one level is done to obtain the proper zone code value for the Bit 3 bits.

With the aid of FIGS. 19-34, there will now be described in considerable detail a representative form of construction for the second level byte shifters (and format converters) 52 and 55. In particular, FIGS. 19-26 show representative logic circuit constructions for the Bit 3 second level switching elements 81-88, respectively. Similarly, FIGS. 27-34 show representative logic circuit constructions for the Bit 7 second level switching logic elements 101-108, respectively.

Figure 19:
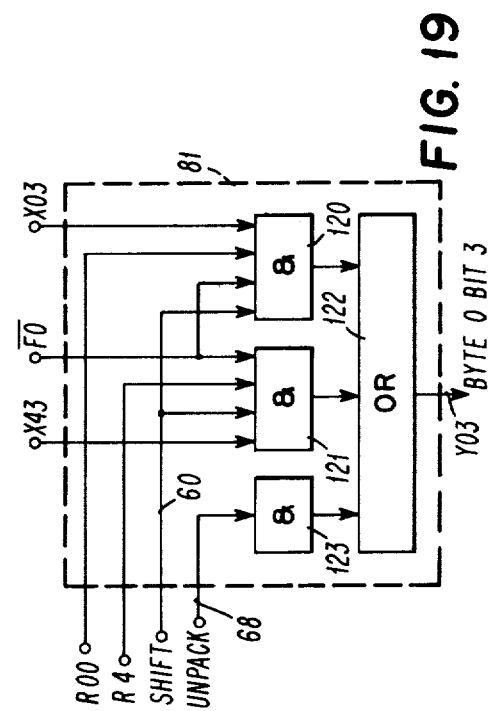
FIGS. 19-26 are individual logic circuit diagrams for the eight Bit 3 second level switching logic elements (SW) shown in FIG. 14.

Referring first to FIG. 19, there is shown the logic circuit construction for the Bit 3 second level switching element 81. Normal data shifting operations are accomplished by means of AND circuits 120 and 121 which have their outputs connected to an OR circuit 122. During a shift operation, the shift control line 60 is at the binary one level. This enables the second input of each of the AND circuits 120 and 121. For the moment, it is assumed that the inverted Byte 0 pad flag $\overline{F0}$ is at the binary one level (the "no pad" level). This enables the fourth input of each of the AND circuits 120 and 121. If the second level shifter is to provide a zero shift (no shift), then the R00 shift amount line is at the one level and the R4 shift amount line is at the zero level. This enables the AND circuit 120 and disables the AND circuit 121. This, in turn, couples the X03 input conductor to the Y03 output conductor, which is the desired result. For the case where the second level shifter is to provide a four-byte shift, the situation is reversed and the R00 line is at the zero level and the R4 line is at the one level. This disables the AND circuit 120 and enables the AND circuit 121. This, in turn, couples the X43 input conductor to the Y03 output conductor, which is the desired result.

If the shifter is operating in the pad mode and if Byte 0 is to be padded with zeros, then the inverted pad flag signal $\overline{F0}$ goes to zero. This disables both of the AND circuits 120 and 121 to thereby produce a zero level on the output conductor Y03. During pack and unpack format converting operations, the shift control line 60 is at the zero level. This disables both of the AND circuits 120 and 121 and thereby, in effect, disables the data shifting portion of the switching element 81.

The shifter portion of each of the other second level switching elements 82-88 and 101-108 is of the same construction as just described for the switching element 81. Hence, though shown in the drawings, these shifter portions for the other second level switching elements will not be described in detail herein.

Considering now the format converter portion of the switching element 81 of FIG. 19, such portion is represented by an AND circuit 123 and the unpack control line 68 which is connected to the input thereof. The unpack control line 68 is at the binary one level during the performance of an unpack format conversion, either with or without sign. This forces the output conductor Y03 to the binary one level which, as indicated in FIG. 18, is the desired result. During the performance of a pack operation, on the other hand, the output conductor Y03 should, as indicated in FIG. 17, be forced to the zero level. In the present embodiment, this is accomplished by simply not making any circuit connections to the switching element 81 for the case of the packing operation. Thus, since all of the AND gates 120, 121 and 123 are disabled (zero output levels) and since no other signal is supplied to the OR circuit 122, the output conductor Y03 remains at the zero level.

Figure 20:
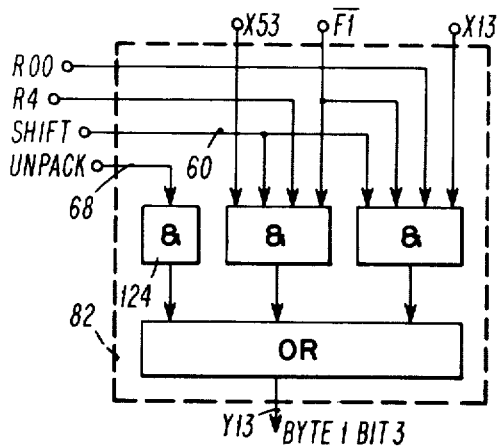
Figure 21:
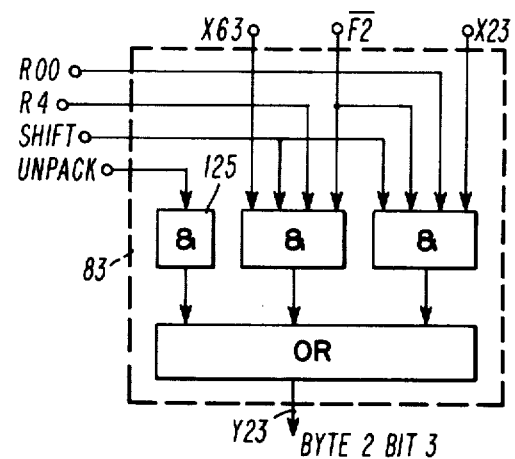
Figure 22:
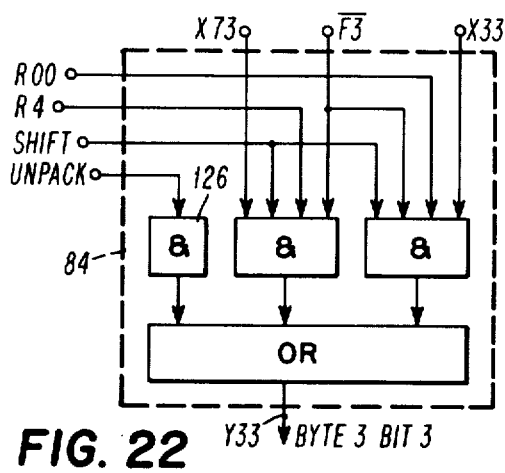

As seen from FIGS. 20, 21 and 22, the format converter portion of switching elements 82, 83 and 84 is of the same construction as the format converter portion of the switching element 81 of FIG. 19. In particular, AND circuits 124, 125 and 126 represent the format converter portions in FIGS. 20, 21 and 22, respectively.

Figure 23:
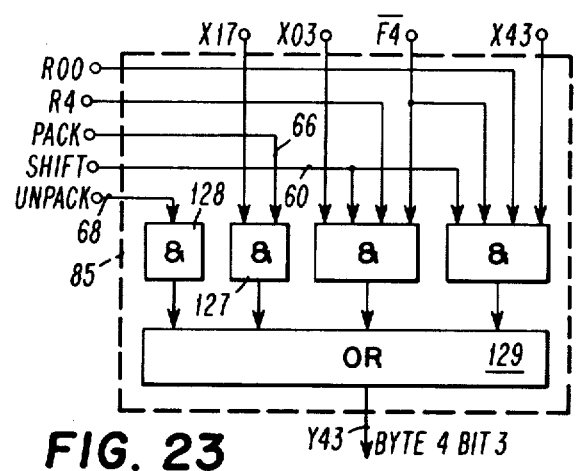

Referring to FIG. 23, the format converter portion of the switching element 85 is represented by AND circuits 127 and 128, the outputs of which are connected to OR circuit 129. During a pack operation, the control line 66 is at the one level and the control line 68 is at the zero level. This enables the AND gate 127, thereby to couple the input conductor X17 to the output conductor Y43. As indicated in FIG. 17, this is the desired result for the pack operation. As indicated by the right-hand digit in these conductor legends, this coupling is one of the bit crossover cases. During an unpack operation, on the other hand, the situation is reversed and control line 68 is at the one level and control line 66 is at the zero level. This enables the AND circuit 128 to force a one level condition on the output conductor Y43. As indicated in FIG. 18, this is the desired result for an unpack operation.

Figure 24:
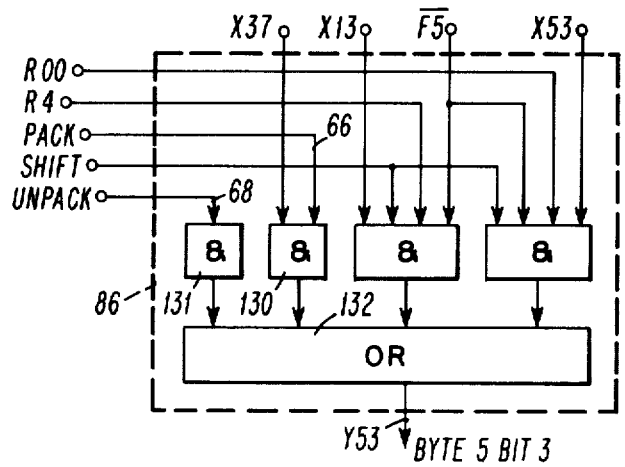

Referring to FIG. 24, the format converter portion of the switching element 86 is represented by an AND gate circuit 130 and an AND circuit 131, the outputs of which are coupled to an OR circuit 132. This construction is the same as in the previous switching element 85.

Figure 25:
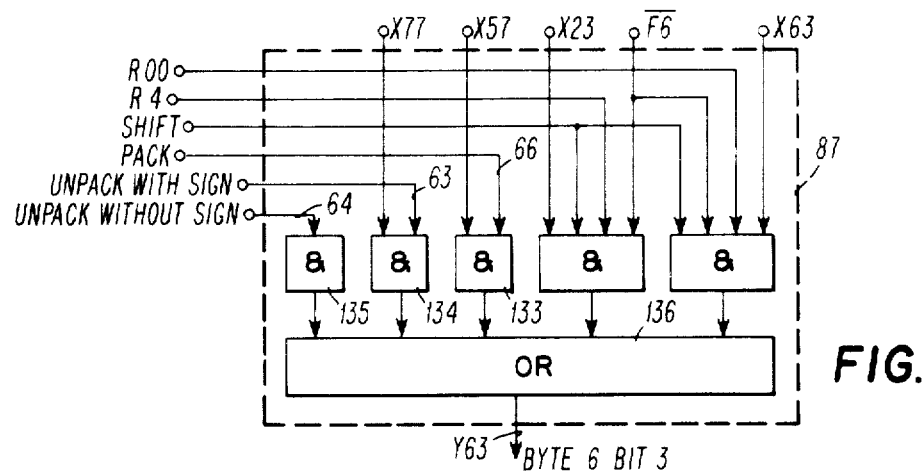

Referring to FIG. 25, the format converter portion of the switching element 87 is represented by AND circuits 133, 134 and 135, the outputs of which are connected to an OR circuit 136. Only one of these AND circuits is enabled during any given format conversion operation, the other two being disabled for such operation. During a pack operation, the AND circuit 133 is enabled to thereby couple the input conductor X57 to the output conductor Y63 which, as indicated in FIG. 17, is the desired result. During an unpack with sign operation, the AND circuit 134 is enabled to thereby couple the input conductor X77 to the output conductor Y63. During the performance of an unpack without sign operation, the AND circuit 135 is enabled to force a one level on the output conductor Y63. As indicated in FIG. 18, these are the desired results for the two unpack cases.

Figure 26:
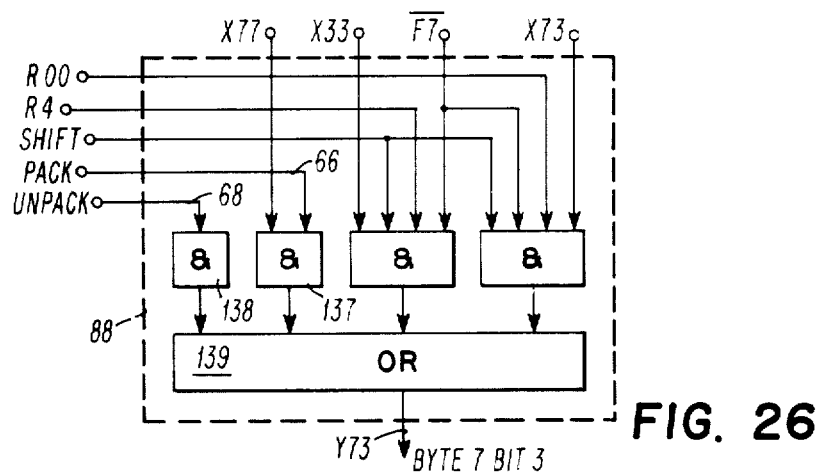

Referring to FIG. 26, the format converter portion of the switching element 88 is represented by AND circuits 137 and 138, the outputs of which are connected to OR circuit 139. This format converter portion is of the same construction as the format converter portions in the previously considered switching elements 85 and 86.

Figure 27:
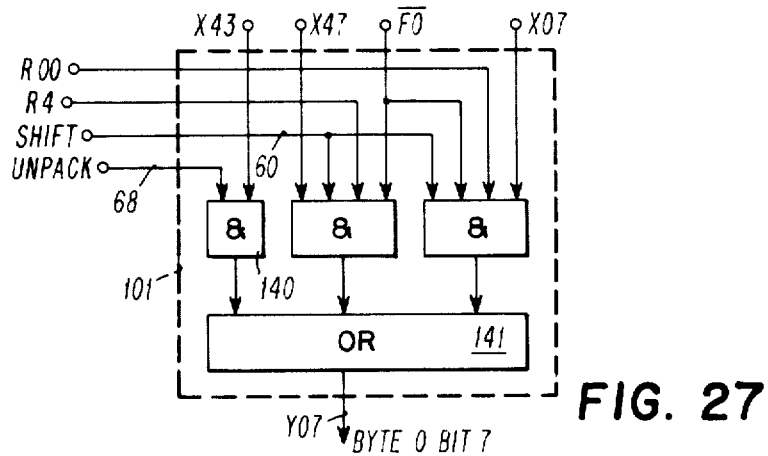
FIGS. 27-34 are individual logic circuit diagrams for the eight Bit 7 second level switching logic elements (SW) of FIG. 14.

Referring to FIG. 27, the format converter portion of the first Bit 7 second level switching element 101 is represented by an AND circuit 140, the output of which is coupled to an OR circuit 141. During the performance of an unpack operation, either with or without sign, the unpack control line 68 is at the one level to enable the AND circuit 140, thereby to couple the input conductor X43 to the output conductor Y07. As indicated in FIG. 18, this is the desired result for an unpack operation. During the performance of a pack operation, the output conductor Y07 is forced to the zero level by the simple expedient of not making any connections to the switching element 101 for this operation. As indicated in FIG. 17, this is the desired result for a pack operation.

Figure 28:
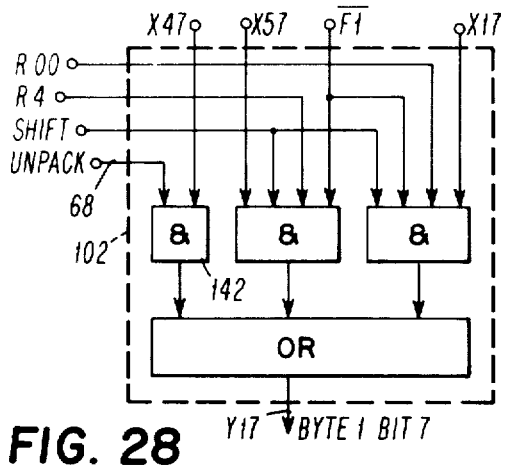
Figure 29:
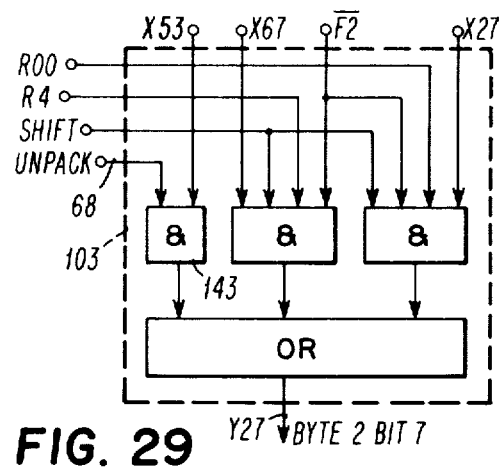

The format converter portions of the next two switching elements 102 and 103 are, as indicated in FIGS. 28 and 29, of the same construction as the format converter portion of FIG. 27. In FIG. 28, the format converter portion is represented by AND circuit 142 and, in FIG. 29, by the AND circuit 143.

Figure 30:
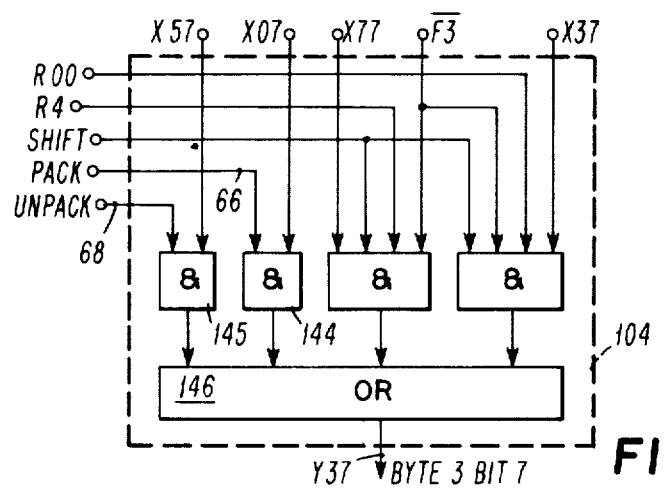

Referring to FIG. 30, the format converter portion of the switching element 104 is represented by AND circuits 144 and 145, the outputs of which are connected to an OR circuit 146. During a pack operation, the pack control line 66 is at the one level and the unpack control line 68 is at the zero level to enable the AND circuit 144 and disable the AND circuit 145. This couples the input conductor X07 to the output conductor Y37. During an unpack operation, the levels on control lines 68 and 66 are reversed to enable the AND circuit 145 and disable the AND circuit 144. This couples the input conductor X57 to the output conductor Y37. As indicated in FIGS. 17 and 18, these are the desired results for the pack and unpack operations.

Figure 31:
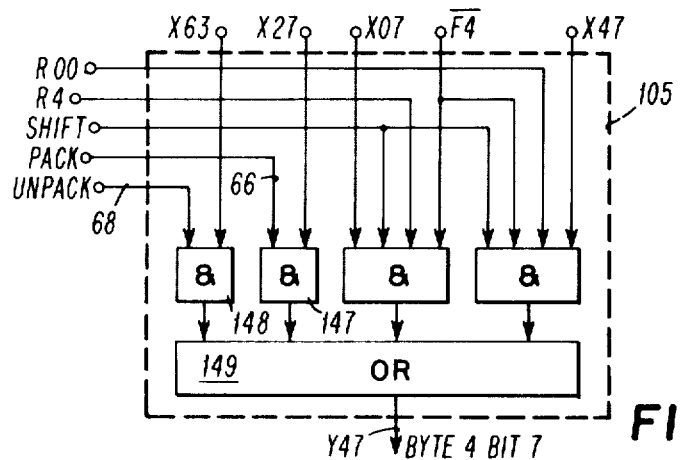
Figure 32:
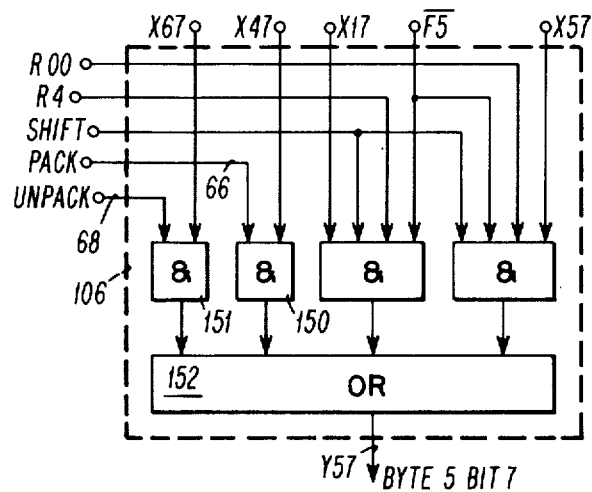
Figure 33:
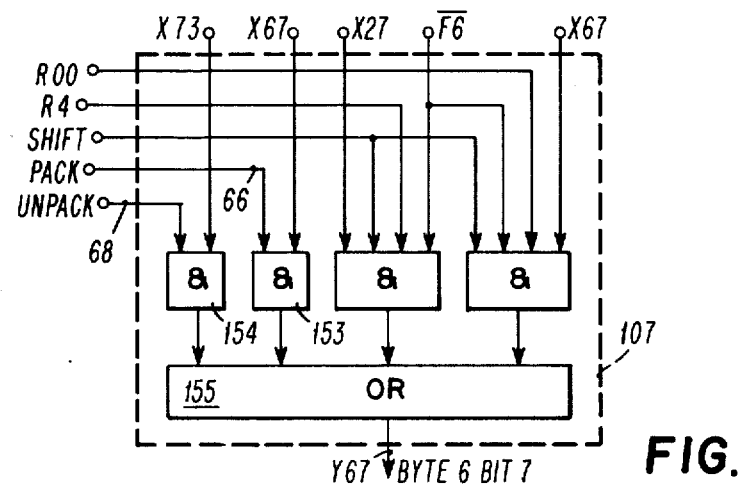

The format converter portion in FIG. 31 is represented by AND circuits 147 and 148, the outputs of which are coupled to an OR circuit 149. The format converter portion in FIG. 32 is represented by AND circuits 150 and 151, the outputs of which are connected to an OR circuit 152. The format converter portion in FIG. 33 is represented by AND circuits 153 and 154, the outputs of which are connected to OR circuit 155. As seen by comparison with FIG. 30, these format converter portions for switching elements 105, 106 and 107 are of the same construction as for the switching element 104 shown in FIG. 30.

Figure 34:
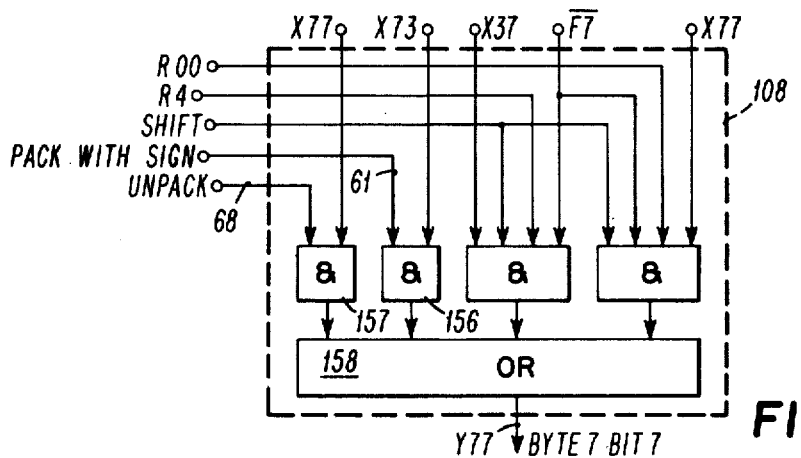

Referring to FIG. 34, the format converter portion of the switching element 108 is represented by AND circuits 156 and 157, the outputs of which are connected to OR circuit 158. In this case, the pack with sign control line 61 is used in place of the pack control line 66 used in FIGS. 30-33. During the performance of a pack without sign operation, the output conductor Y77 is forced to the zero level because, in this case, all of the AND circuits are disabled (outputs at zero) and no other signal is supplied to the OR circuit 158.

Referring now to FIG. 35, there is shown an overall wiring and logic diagram for the two second level shifters 52 and 55 of FIGS. 12 and 14, but showing only the wiring and logic circuitry needed for performing the packing and unpacking operations and omitting the wiring and logic circuitry needed for normal data shifting operations. In particular, only the format converter portions of switching elements 81-88 and 101-108 are shown in FIG. 35. As such, FIG. 35 is helpful in providing an overall understanding of the relationship between the different format converter portions which are individually shown in FIGS. 19-34.

With reference to FIG. 11, each of the other integrated circuit chips 42, 43 and 44 are of the same construction and operation as described in detail hereinabove for the case of the integrated circuit chip 45. The only difference between the chips is in the particular input and output data conductors which are connected to the different ones of such chips. In particular, the two second level byte shifters (and format converters) on each of the other integrated circuit chips 42, 43 and 44 are of the same detailed construction as shown in FIGS. 14-34 for the case of the second level shifters (and format converters) 52 and 55 located on integrated circuit chip 45. Thus, in each case, the bit crossover conductors do not have to leave the confines of the integrated circuit chip on which they are needed. As a consequence, the format converting functions are obtained with no appreciable increase in the number of chip input/output connections.

The simultaneous multibyte data format converting apparatus described herein enables packing and unpacking operations to be performed in a much faster manner than is the case for existing present day data processors. With the apparatus described herein, such operations need no longer be performed one byte at a time.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In a digital data processor, the combination comprising:

data flow circuitry for simultaneously supplying multiple bytes of binary coded data in a parallel manner;

multibyte shifter circuitry located in the processor data flow for simultaneously receiving these multiple bytes of data, performing shift operations thereon and supplying the shifted bytes of data back to the data flow in a parallel manner;

and format conversion circuitry associated with the shifter circuitry for enabling the shifter circuitry to alternatively and selectively perform a data format conversion operation on the multiple bytes of data passing through the shifter circuitry.

2. In a digital data processor, the combination comprising:

data flow circuitry for simultaneously supplying multiple bytes of binary coded data in a parallel manner;

multibyte shifter circuitry located in the processor data flow for simultaneously receiving these multiple bytes of data, performing shift operations thereon and supplying the shifted bytes of data back to the data flow in a parallel manner;

and format conversion circuitry associated with the shifter circuitry for enabling the shifter circuitry to alternatively and selectively convert multiple bytes of binary coded decimal data from one to the other of a zoned format and a packed format.

3. In a digital data processor, the combination comprising:

first and second multibyte data buses for conveying data bits in a parallel manner;

multibyte shifter circuitry coupled to the first data bus for simultaneously receiving multiple bytes of data, performing shift operations thereon and supplying the shifted bytes of data to the second data bus in a parallel manner;

and format conversion circuitry associated with the shifter circuitry for enabling the shifter circuitry to alternatively and selectively convert multiple bytes of binary coded decimal data from one to the other of a zoned format and a packed format.

4. The combination of claim 3 wherein each byte of data includes eight data bits and wherein the shifter circuitry and the format conversion circuitry are located on four integrated circuit chips with the circuitry for the first and fifth data bits of each byte being located on a first chip, the circuitry for the second and sixth data bits of each byte being located on a second chip, the circuitry for the third and seventh data bits of each byte being located on a third chip and the circuitry for the fourth and eighth data bits of each byte being located on a fourth chip, whereby multiple bytes of data can be handled with integrated circuit chips having a minimum number of chip input/output connections.

5. In a digital data processor, the combination comprising:

first and second multibyte data buses for conveying data bits in a parallel manner;

multibyte shifter circuitry coupled to the first data bus for simultaneously receiving multiple bytes of data, performing shift operations thereon and supplying the shifted bytes of data to the second data bus in a parallel manner, such shifter circuitry including circuitry for selectively coupling each one of the conductors in the first data bus to different ones of the conductors in the second data bus;

format conversion circuitry associated with the shifter circuitry for enabling the shifter circuitry to alternatively and selectively perform either a zoned decimal to packed decimal conversion or a packed decimal to zoned decimal conversion on the multiple bytes of data passing through the shifter circuitry;

and control circuitry associated with the shifter circuitry for selectively enabling the performance of normal shift operations or a zoned decimal to packed decimal conversion or a packed decimal to zoned decimal conversion.

6. The combination of claim 5 wherein each byte of data includes eight data bits and wherein the shifter circuitry, the format conversion circuitry and the control circuitry are located on four integrated circuit chips with the circuitry for the first and fifth data bits of each byte being located on a first chip, the circuitry for the second and sixth data bits of each byte being located on a second chip, the circuitry for the third and seventh data bits of each byte being located on a third chip and the circuitry for the fourth and eighth data bits of each byte being located on a fourth chip, whereby multiple bytes of data can be handled with integrated circuit chips having a minimum number of chip input/output connections.

7. The combination of claim 5 wherein the format conversion circuitry includes:

zoned-to-packed conversion circuitry for coupling the conductors for selected nonadjacent data fields on the first data bus to the conductors for selected adjacent data fields on the second data bus;

and packed-to-zoned conversion circuitry for coupling the conductors for selected adjacent data fields on the first data bus to the conductors for selected nonadjacent data fields on the second data bus.

8. The combination of claim 7 wherein each byte of data includes eight data bits and wherein the shifter circuitry, the zoned-to-packed conversion circuitry, the packed-to-zoned conversion circuitry and the control circuitry are located on four integrated circuit chips with the circuitry for the first and fifth data bits of each byte being located on a first chip, the circuitry for the second and sixth data bits of each byte being located on a second chip, the circuitry for the third and seventh data bits of each byte being located on a third chip and the circuitry for the fourth and eighth data bits of each byte being located on a fourth chip, whereby multiple bytes of data can be handled with integrated circuit chips having a minimum number of chip input/output connections.

9. Data shifting and format converting apparatus for simultaneously operating on multiple bytes of data wherein each byte includes eight data bits and such apparatus comprises:

a first integrated circuit chip for receiving and processing the first and fifth data bits of each byte;

a second integrated circuit chip for receiving and processing the second and sixth data bits of each byte;

a third integrated circuit chip for receiving and processing the third and seventh data bits of each byte;

a fourth integrated circuit chip for receiving and processing the fourth and eighth data bits of each byte;

each of these integrated circuit chips including shifter circuitry for simultaneously shifting its data bits, data format conversion circuitry for simultaneously adjusting the relative positions of selected ones of its data bits in the manner needed to obtain a predetermined data format conversion and control circuitry for selectively enabling either the shifter circuitry or the data format conversion circuitry;

whereby the unique groupings of the circuits for the different data bits on the different integrated circuit chips enables the processing of multiple bytes of data with integrated circuit chips having a minimum number of chip input/output connections.

10. Data shifting and format converting apparatus for simultaneously operating on multiple bytes of data wherein each byte includes eight data bits and such apparatus comprises:

a first integrated circuit chip for receiving and processing the first and fifth data bits of each byte;

a second integrated circuit chip for receiving and processing the second and sixth data bits of each byte;

a third integrated circuit chip for receiving and processing the third and seventh data bits of each byte;

a fourth integrated circuit chip for receiving and processing the fourth and eighth data bits of each byte;

each of these integrated circuit chips including shifter circuitry for simultaneously shifting its data bits, first format conversion circuitry for simultaneously adjusting the relative positions of selected ones of its data bits in the manner needed to obtain a zoned decimal to packed decimal conversion, second format conversion circuitry for simultaneously adjusting the relative positions of selected ones of its data bits in the manner needed to obtain a packed decimal to zoned decimal conversion and control circuitry for selectively enabling only one of the shifter circuitry, the first format conversion circuitry and the second format conversion circuitry;

whereby the unique groupings of the circuits for the different data bits on the different integrated circuit chips enables the processing of multiple bytes of data with integrated circuit chips having a minimum number of chip input/output connections.

11. Apparatus for simultaneously converting multiple bytes of decimal data from one to the other of a zoned format and a packed format comprising:

first and second multibyte data buses having correspondingly designated conductors for conveying data bits in a parallel manner;

and circuitry for coupling selected groups of conductors in the first data bus to differently designated groups of conductors in the second data bus so that the selected data fields on the first data bus are supplied to the second data bus in a displaced manner relative to the bit designations on the two data buses and with the amount of displacement being different for different ones of the selected data fields on the first data bus, whereby the selected data fields are reproduced on the second data bus with a different bit spacing between such fields.

12. Apparatus for simultaneously converting multiple bytes of zoned decimal data to packed decimal data or vice versa comprising:

first and second multibyte data buses for conveying data bits in a parallel manner;

zoned-to-packed conversion circuitry for coupling the conductors for selected nonadjacent data fields on the first data bus to the conductors for selected adjacent data fields on the second data bus;

packed-to-zoned conversion circuitry for coupling the conductors for selected adjacent data fields on the first data bus to the conductors for selected nonadjacent data fields on the second data bus;

and control circuitry for selectively enabling one and disabling the other of the zoned-to-packed and the packed-to-zoned conversion circuitry.

13. Apparatus for simultaneously converting multiple bytes of zoned decimal data to packed decimal data wherein each byte of zoned data is comprised of a higher order zone field and a low order digit field and each byte of packed data is comprised of high order and low order digit fields, said apparatus comprising:

first and second multibyte data buses for conveying data bits in a parallel manner;

and zoned-to-packed conversion circuitry for coupling the conductors for selected nonadjacent data fields on the first data bus to the conductors for selected adjacent data fields on the second data bus, said zoned-to-packed conversion circuitry including first coupling circuitry for coupling the conductors for the low order digit fields of alternate bytes on the first data bus to the conductors for low order digit fields on the second data bus, and second coupling circuitry for coupling the conductors for the low order digit fields of intervening bytes on the first data bus to the conductors for high order digit fields on the second data bus.

14. Apparatus in accordance with claim 13 wherein the lowest order byte of zoned data on the first data bus is comprised of a high order sign field and a low order digit field and wherein the zoned-to-packed conversion circuitry further includes third coupling circuitry for coupling the conductors for the sign field of the lowest order byte on the first data bus to the conductors for the low order digit field of the lowest order byte on the second data bus.

15. Apparatus for simultaneously converting multiple bytes of packed decimal data to zoned decimal data wherein each byte of zoned data is comprised of a high order zone field and a low order digit field and each byte of packed data is comprised of high order and low order digit fields, said apparatus comprising:

first and second multibyte data buses for conveying data bits in a parallel manner;

and packed-to-zoned conversion circuitry for coupling the conductors for selected adjacent data fields on the first data bus to the conductors for selected nonadjacent data fields on the second data bus said packed-to-zoned conversion circuitry including first coupling circuitry for coupling the conductors for the high order digit fields of selected bytes on the first data bus to the conductors for low order digit fields of alternate bytes on the second data bus, and second coupling circuitry for coupling the conductors for the low order digit fields of these same selected bytes on the first data bus to the conductors for low order digit fields of intervening bytes on the second data bus.

16. Apparatus in accordance with claim 15 wherein the packed-to-zoned conversion circuitry further includes circuitry for causing the conductors for the high order field of each byte on the second data bus to have the zone field code.

17. Apparatus in accordance with claim 15 wherein the lowest order byte of packed data on the first data bus is comprised of a high order digit field and a low order sign field and wherein the packed-to-zoned conversion circuitry further includes third coupling circuitry for coupling the conductors for the sign field of the lowest order byte on the first data bus to the conductors for the high order field of the next to the lowest order byte on the second data bus.

18. Apparatus for simultaneously converting multiple bytes of packed decimal data to zoned decimal data wherein each byte of packed decimal data is comprised of a high order and a low order digit field and each byte of zoned decimal data is comprised of a high order zone field and a low order digit field and such apparatus comprises:

first and second multibyte data buses each having the same number of conductors for conveying data bits in a parallel manner;

packed-to-zoned conversion circuitry for coupling the conductors for the lower order half of the digit fields on the first data bus to the conductors for the low order digit fields of each byte on the second data bus;

and shifter circuitry located between the first data bus and the packed-to-zoned conversion circuitry and operative at a time different from the conversion of the lower order half of the digit fields on the first data bus for shifting the data on the first data bus by an amount equal to one half of the width of the first data bus for enabling the higher order half of the digit fields on the first data bus to be converted to zoned decimal data by the same conversion circuitry used for the lower order half of the digit fields on the first data bus.

* * * * *